United States Patent
Wein

(10) Patent No.: US 9,141,435 B2
(45) Date of Patent: Sep. 22, 2015

(54) SYSTEM AND METHODOLOGY PROVIDING WORKLOAD MANAGEMENT IN DATABASE CLUSTER

(75) Inventor: David Wein, Saint Paul, MN (US)

(73) Assignee: Sybase, Inc., Dublin, CA (US)

( * ) Notice: Subject to any disclaimer, the term of this patent is extended or adjusted under 35 U.S.C. 154(b) by 2272 days.

(21) Appl. No.: 11/840,283

(22) Filed: Aug. 17, 2007

(65) Prior Publication Data

US 2009/0037367 A1     Feb. 5, 2009

Related U.S. Application Data

(60) Provisional application No. 60/952,819, filed on Jul. 30, 2007.

(51) Int. Cl.
| | |
|---|---|
| *G06F 9/50* | (2006.01) |
| *G06F 11/20* | (2006.01) |
| *G06F 17/30* | (2006.01) |
| *G06F 11/34* | (2006.01) |

(52) U.S. Cl.
CPC ............ *G06F 9/5083* (2013.01); *G06F 9/5061* (2013.01); *G06F 11/2035* (2013.01); *G06F 11/2046* (2013.01); *G06F 11/2097* (2013.01); *G06F 11/3433* (2013.01); *G06F 17/30306* (2013.01); *G06F 11/3409* (2013.01); *G06F 2201/80* (2013.01); *G06F 2209/5019* (2013.01); *G06F 2209/5022* (2013.01)

(58) Field of Classification Search
CPC .................................. G06F 17/30306
USPC ............................................ 707/1–5; 718/105
See application file for complete search history.

(56) References Cited

U.S. PATENT DOCUMENTS

| | | | |
|---|---|---|---|
| 6,782,410 B1 * | 8/2004 | Bhagat et al. ................. | 709/201 |
| 2004/0267897 A1 * | 12/2004 | Hill et al. ...................... | 709/217 |
| 2007/0271570 A1 * | 11/2007 | Brown et al. ................. | 718/105 |

* cited by examiner

*Primary Examiner* — Hosain Alam
*Assistant Examiner* — Navneet K Gmahl
(74) *Attorney, Agent, or Firm* — Sterne, Kessler, Goldstein & Fox P.L.L.C

(57) ABSTRACT

A system and methodology providing workload management in a database cluster. In one embodiment, for example, a method for allocating workload amongst a plurality of database servers sharing access to data comprises steps of: periodically collecting information about workload at each database server; distributing the workload information to each of the plurality of database servers; in response to a client connected to a first database server requesting that work be performed, examining the workload information to determine whether the requested work should be performed at a second database server having a lower workload than the first database server; if it is determined that the work should be performed at the second database server, automatically transferring the client connection to the second database server and performing the requested work at the second database server; and otherwise, performing the requested work at the first database server.

41 Claims, 11 Drawing Sheets

SYSTEM AND METHODOLOGY PROVIDING WORKLOAD MANAGEMENT IN DATABASE CLUSTER

CROSS REFERENCE TO RELATED APPLICATIONS

The present application is related to and claims the benefit of priority of the following commonly-owned, provisional application(s): application Ser. No. 60/952,819, filed Jul. 30, 2007, entitled "System and Methodology Providing Workload Management in Database Cluster", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 47297 Bytes, created: 07/30/07 1:30:58 PM; Object ID: File No. 1; Object Contents: Source code.

BACKGROUND OF INVENTION

1. Field of the Invention

The present invention relates to database management and, more particularly, to a system and methodology providing workload management in distributed database management systems.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

In recent years, users have demanded that database systems be continuously available, with no downtime, as they are frequently running applications that are critical to business operations. In response, distributed database systems have been introduced to provide for greater reliability. More recently, "Shared Disk Cluster" database systems have been introduced to provide increased reliability and scalability. A "Shared Disk Cluster" (or "SDC") database system is a system that has a cluster of two or more database servers having shared access to a database on disk storage. The term "cluster" refers to the fact that these systems involve a plurality of networked server nodes which are clustered together to function as a single system. Each node in the cluster usually contains its own CPU and memory and all nodes in the cluster communicate with each other, typically through private interconnects. "Shared disk" refers to the fact that two or more database servers share access to the same disk image of the database. Shared Disk Cluster database systems provide for transparent, continuous availability of the applications running on the cluster with instantaneous failover amongst servers in the cluster. When one server is down (e.g., for upgrading the CPU) the applications are able to continue to operate against the shared data using the remaining machines in the cluster, so that a continuously available solution is provided. Shared Disk Cluster systems also enable users to address scalability problems by simply adding additional machines to the cluster, without major data restructuring and the associated system downtime that is common in prior SMP environments.

Although Shared Disk Cluster database systems provide increased availability and reliability, they also introduce a number of new challenges. Among these challenges are that different SDC systems are used for running a wide variety of applications, each of which may have different workload profiles and resource requirements. SDC systems are subject to varied deployment requirements both in terms of the applications that users want to run on the cluster and how they want to run those applications. For example, one organization may want to run a single application across many nodes of a cluster while another may want to use its cluster to consolidate and run several applications that were previously run on different machines. Also, some users may have monolithic applications which are evenly spread out among nodes of the cluster, while others want to partition the cluster so that certain applications run on certain nodes of the cluster so as to allocate resources amongst applications sharing use of the SDC.

The demands placed by the applications on the cluster may also differ to a considerable agree in different deployment environments. For example, a cluster may host both an order entry application which is write intensive as well as a read-only application (e.g., an application serving up Web pages). A SDC may also host both mission critical production applications as well as lower priority applications (e.g., development or testing applications). Thus, there are many different ways that organizations may wish to utilize SDC systems. Organizations may, in fact, wish to deploy a combination of several of the different types of applications described above on a single cluster.

What is needed to make most effective use of SDC systems is a comprehensive workload management solution that will enable users to host several different types of applications with differing business priorities, transaction profiles and availability requirements on a single cluster. This workload management solution should provide support for deploying any combination of applications and should allow each of the applications to peacefully and cooperatively share the use of the SDC, even if the applications have very different requirements for performance. The present invention provides a solution for these and other needs.

SUMMARY OF INVENTION

A system and methodology providing workload management in a database cluster is described. In one embodiment, for example, a method of the present invention is described for allocating workload amongst a plurality of database servers sharing access to data, the method comprises steps of: periodically collecting information about workload at each database server; distributing the workload information to each of the plurality of database servers; in response to a client connected to a first database server requesting that work be performed, examining the workload information to determine whether the requested work should be performed at a second database server having a lower workload than the first database server; if it is determined that the work should be performed at the second database server, automatically transferring the client connection to the second database server and performing the requested work at the second database server; and otherwise, performing the requested work at the first database server.

In another embodiment, for example, in a distributed database system comprises a plurality of servers sharing access to data, a method of the present invention is described for directing clients to connect to servers based on workload, the method comprises steps of: periodically collecting statistics about workload at each of the plurality of servers; calculating a load score for each server based on the collected statistics; distributing the load score to each of the plurality of servers; in response to a client attempting to connect to a particular server, determining whether the client should be redirected to another server based on the load scores; if it is determined that the client should be redirected to another server, providing the client with an ordered list of servers to which the client may connect; and otherwise, allowing the client to connect to the particular server.

In yet another embodiment, for example, in a distributed database cluster comprising a plurality of database servers, a system of the present invention for allocating workload amongst the plurality of database servers is described that comprises: a statistics collector module which periodically collects workload statistics at each database server; a load profile module at each database server for calculating a load score for such database server based on the workload statistics and publishing the load score to other database servers in the cluster; and a workload manager module, responsive to a client requesting that work be performed at the first database server, which automatically transfers the client to a second database server when it determines that the requested work should be performed at a second database server having a lower load score than the first database server.

DETAILED DESCRIPTION

Glossary

Figure 1:
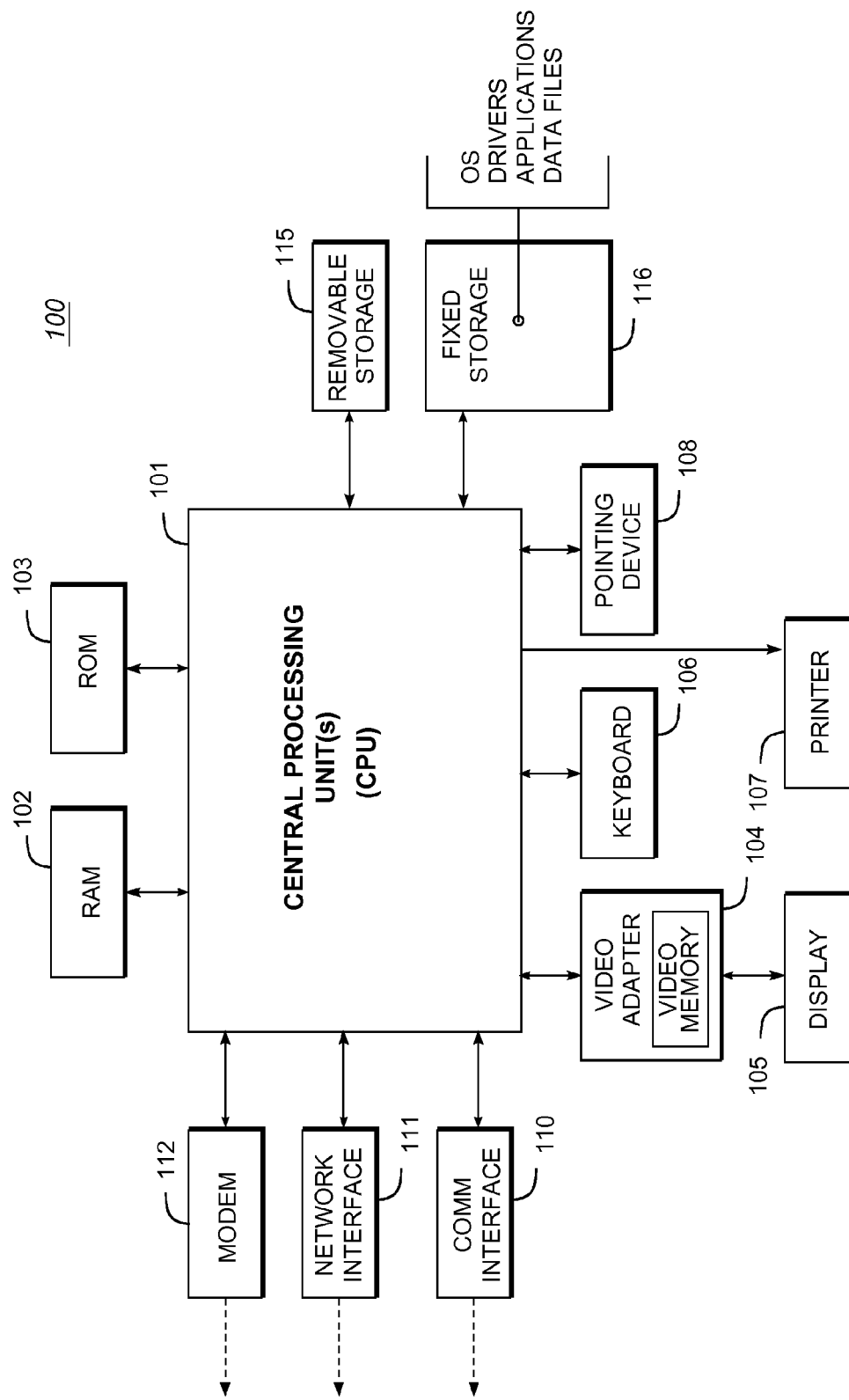
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Action: a user-executed command provided by the present invention to initiate a planned failover, downtime, or other administrative task.

Cache: a cache is a section of relatively faster memory (e.g., RAM) allocated to temporarily store data objects so as to provide faster access to such objects (e.g., when compared to access of such objects from disk).

CES: CES stands for cluster event system which is a subscribe/publish mechanism used in the presently preferred embodiment to post events to interested processes cluster-wide. For instance, a workload manager (wlmgr) daemon module of the present invention listens for wlmgr events triggered by administrative commands. When a wlmgr event is posted, the wlmgr daemon will receive the event indicating certain action(s) should be taken.

Clustered Server: A clustered server refers to a database server which runs on a Shared Disk Cluster and jointly manages a single installation of the database(s) on the shared disks.

Configuration file or config file: refers to the configuration file of a clustered server, which helps in configuring the server at boot time. This configuration file contains parameters which define the number of connections the server should handle, the number of lock structures it can allocate, and so forth. When dynamic parameters are changed, the changes are also written to the config file to make the changes persistent.

Connection Redirection: Another term for login redirection (see Login Redirection below).

Connection Migration: For an established connection, the instance directs the client to disconnect and connect to a different instance. Connection migration is a feature of the present invention used for dynamic load distribution and to support administrative actions in logical clusters.

Context Migration: An internal mechanism of the present invention used to support connection migration. Some aspects of client connection context, such as current database and set options, are replicated to the client's new node as part of connection migration.

Dynamic Load Distribution: A feature of the present invention for migration of an established client connection to a different clustered server in an attempt to distribute the workload within the cluster.

Instance or Server Instance: A clustered server in a Shared Disk Cluster which is also sometimes referred to as a "node".

Interfaces file: The term interfaces file refers to the standard DBMS interfaces file or any other Directory Control Layer (such as LDAP, etc.) from which connection related information for a dataserver (such as the server name, host name/IP address, protocol, port number, security options etc.) is obtained.

Load Profile: A collection of load metric weights and thresholds that represent a load distribution and reporting policy. Load profiles are associated with applications via logical clusters, and are used to effect how a given application views and reacts to the load across and the cluster.

Logical Cluster: A service oriented method of the present invention for partitioning a physical cluster so that multiple application services can be setup. A logical cluster is an abstract representation of one or more instances in a physical Shared Disk Cluster. Key elements of a logical cluster are resources that the logical cluster runs on, routing rules that associate tasks to the logical cluster, and service management. Logical clusters allow for more fine-grained management of the workload within the cluster by allowing applications to connect to logical clusters rather than the physical cluster. Routing rules direct incoming connections to specific logical clusters based on an application, user login, or server alias supplied by a client.

Logical Failover: refers to the movement of a logical cluster from the instance it is currently running on to a pre-designated failover instance should the current instance go offline or down.

Logical Failback: refers to the movement of a logical cluster from a failover instance back to a primary instance once the primary instance is back online.

Login Redirection: a feature of the present invention which provides, during the login process, for a server instance to direct a client to stop the current login attempt and connect to a different instance by returning a list of network addresses to connect to. Login redirection is used for connection time load distribution and for routing connections to a logical cluster.

Node (Instance) Failover: refers to the possibility of an instance in the cluster going down due to software or hardware failure, resulting in a surviving coordinator instance taking action to recover the instance.

OCM: refers to object coherency manager which is a module utilized in the currently preferred embodiment of the present invention for data coherency and synchronization. The object coherency manager (OCM) combines PCM/RPC with distributed cluster lock manager so as to block reads while writes are in progress and propagates the changes across the cluster.

PCM: stands for peer coordination module, which is a cluster-wide remote procedure call (RPC) mechanism used in the currently preferred embodiment of the present invention for triggering action on another instance. For example, when an administrator creates a new logical cluster on one instance, the workload manager of the present invention will issue a remote procedure call via PCM to trigger the creation of the related data structures on other cluster members.

PSS: stands for Process Status Structure, which is a data structure used to represent a task (also called thread or user connection) in a Sybase Adaptive Server Enterprise DBMS. The PSS contains the identity and current state of the task. It is also used to track query execution and resource consumption.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SDC: SDC stands for Shared Disk Cluster, which is a system that has multiple database servers on two or more machines managing the same disk image of the database(s), by having shared access to disk storage. All instances in the cluster have direct access to a single installation of the database(s).

SMP: SMP stands for symmetric multi-processing system, which is a system comprised of multiple processors (CPUs) and a single RAM memory, which has a single instance of the operating system (O/S) running on it. All the CPUs serve and run all the functionality of the O/S and application symmetrically.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, a HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Client-Server Database Management System

Figure 2:
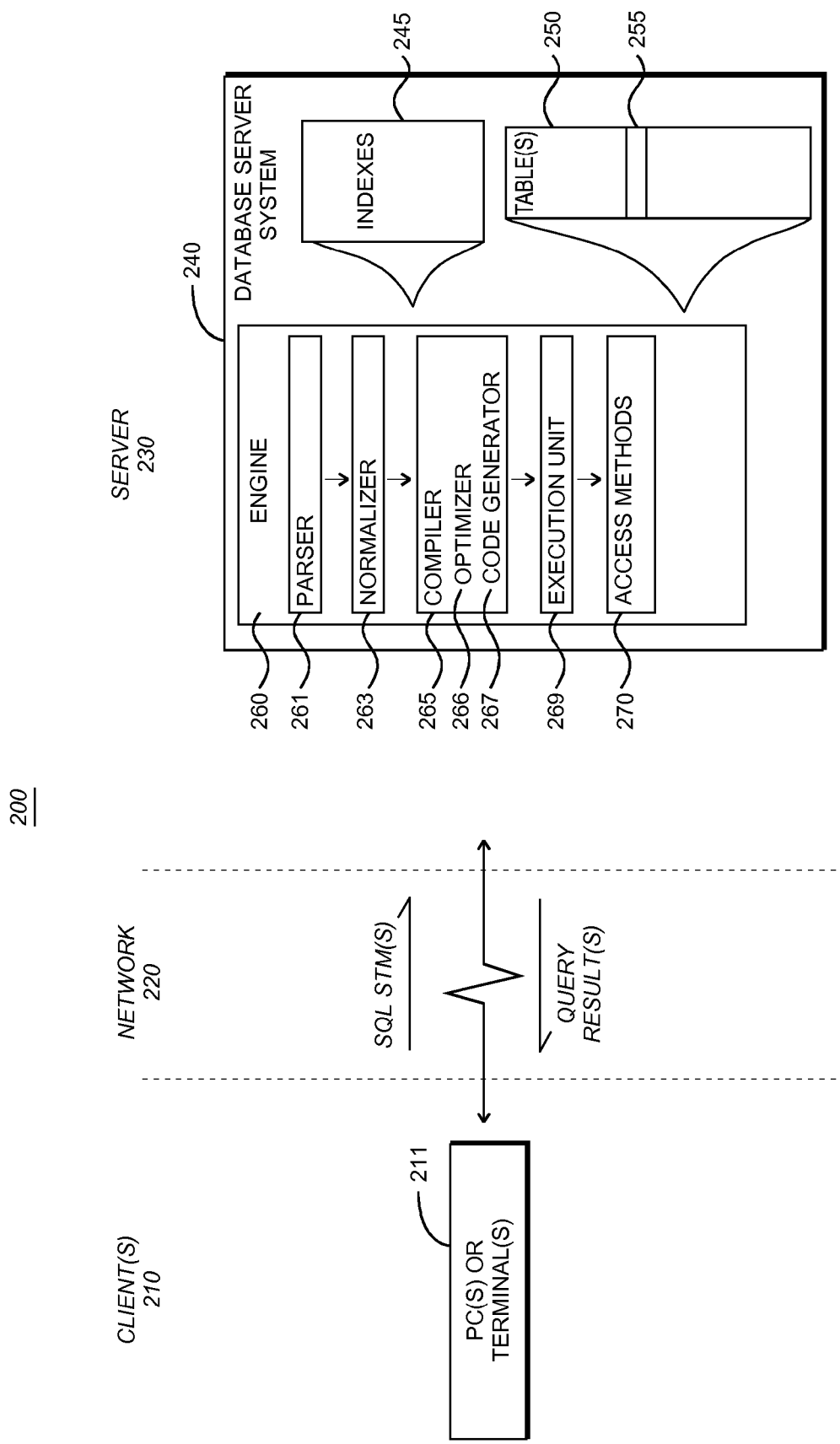
FIG. 2 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 240, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 12.5.1 Collection: (1) Core Documentation Set and (2) Installation and Configuration," available from Sybase, Inc. of Dublin, Calif. This product documentation is available via the Internet (e.g., currently at sybooks.sybase.com/as.html). The disclosures of the foregoing are hereby incorporated by reference.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and an access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

Although client/server database systems remain in wide use, the present invention, in its currently preferred embodiment, is implemented in a Shared Disk Cluster database system environment, which provides several advantages compared to prior art client/server database systems. Among these advantages are that a Shared Disk Cluster system can be more easily expanded. Users may easily add additional servers in order to increase system capacity and provide improved performance without major data restructuring and the associated system downtime. This also enables users to purchase hardware in smaller increments as needed to keep up with growth. Other advantages of Shared Disk Cluster architecture include lower total cost of ownership (TCO), continuous availability, high performance, and single system presentation.

Figure 3:
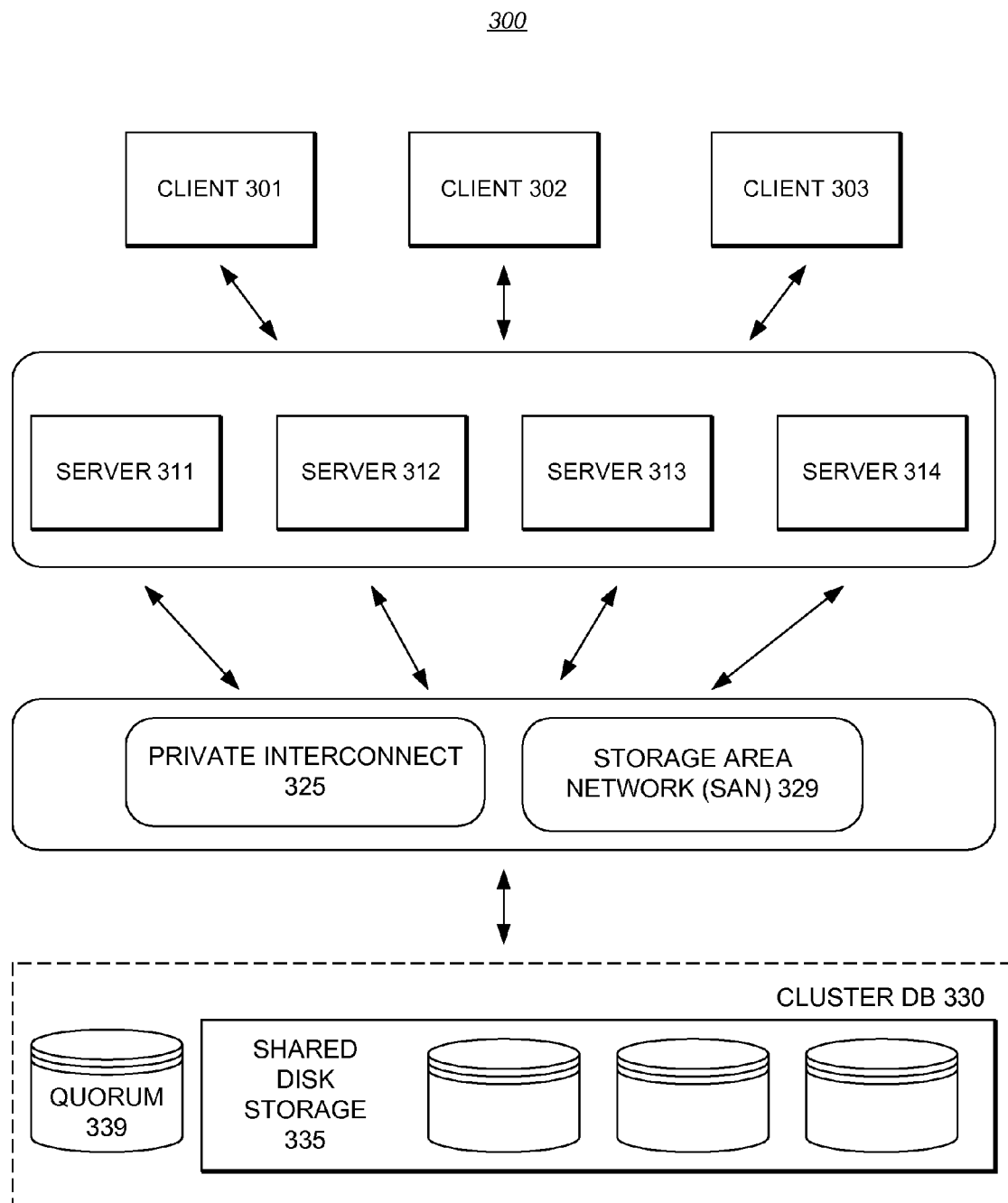
FIG. 3 is a high-level block diagram of a Shared Disk Cluster database system environment illustrating an example of a four node Shared Disk Cluster accessed by a plurality of clients.

FIG. 3 is a high-level block diagram of a Shared Disk Cluster database system environment 300 illustrating an example of a four node (servers 311, 312, 313, 314) Shared Disk Cluster accessed by a plurality of clients (clients 301, 302, 303). The term "cluster" refers to a collection of more than one networked (and usually homogeneous) nodes, which function as a single system. Each node generally contains its own CPU and memory resources. The term "clustered server" refers to a database server (currently implemented using Sybase® Adaptive Server® Enterprise ("ASE") available from assignee Sybase of Dublin, Calif.) which runs on a cluster (cluster DB 330) and jointly manages a single installation of the databases on the shared disk storage 335. As shown, the environment 300 also includes a quorum disk 339. The quorum disk 339 is a shared disk device used for cluster membership arbitration. The quorum disk also maintains a history of runtime cluster view changes.

A Shared Disk Cluster database system can be implemented using low cost "blade servers" such as Intel/Linux machines. In the presently preferred embodiment, nodes in the cluster communicate with each other through private interconnects (e.g., private interconnect 325). As shown at FIG. 3, the nodes are interconnected via redundant high-speed interconnects with each node also having a direct connection to all databases on a disk subsystem. Gigabit Ethernet and Infiniband may be used to provide these high-speed interconnects. The storage subsystem may be implemented using raw device support with a storage area network (SAN 329) or with file system support (e.g., through use of a clustered file system such as those from Veritas or Polyserv).

The above-described computer hardware and software are presented for purposes of illustrating the basic underlying desktop and server computer components that may be employed for implementing the present invention. For purposes of discussion, the following description will present examples in which it will be assumed that there exist multiple server instances (e.g., database servers) in a Shared Disk Cluster environment that communicate with one or more "clients" (e.g., personal computers or mobile devices). The present invention, however, is not limited to any particular environment or device configuration. Instead, the present invention may be implemented in any type of system architecture or processing environment capable of supporting the methodologies of the present invention presented in detail below.

Overview of System and Methodology for Workload Management in Shared Disk Cluster Cluster Workload Management on Application Basis The present invention provides a workload management solution allowing multiple applications to be managed within a Shared Disk Cluster database system. In its currently preferred embodiment, the workload manager (wlmgr) of the present invention is implemented as a component of the Sybase® Adaptive Server® Enterprise (ASE) database software running in a Shared Disk Cluster environment. The workload manager provides support for cluster partitioning, connection routing, as well as login and dynamic load distribution. Cluster partitioning functionality enables administrators or users to logically partition the resources in a physical cluster. Logical clusters enable application or user specific service level agreements, resource assignment, and failover rules. Connection routing, which is also referred to as login or connection redirection, provides capabilities for directing incoming connections to the most appropriate node. Login load distribution features of the present invention provide support for routing incoming connections across cluster nodes based on relative load. Dynamic load distribution features of the present invention provide support for directing an existing connection to another node (connection migration) for various reasons including the addition of a node, an imbalance in workload between nodes, planned downtime of a node, or other administrative action.

The system and methodology of the present invention provides for workload management in the cluster management on a per application basis. The solution routes connections within the cluster based on the application associated with the connection. Users and administrators can also define differing load balancing rules and load reporting based on a per application basis. A user or administrator can set up the cluster with different load profiles for each application running in the cluster. These load profiles enable a load score for each application to be calculated taking into account the differing requirements of each application. For example, a load score may be calculated differently for a decision support (DSS) application and an on line transaction processing (OLTP) application because of the differing resource needs and operational considerations of these two applications. Based on the load scores that are calculated from time to time, the workload manager may reallocate resources amongst applications running on the cluster.

The present invention also provides for various availability models to be set at the application level. These availability models may include, for example, the following: a "1+1" model with one active and one standby node; a "N+1" model with several active instances and one standby; and a "N+M" model with several active and several standby instances. The solution also provides for administrative failover, failback, and migration amongst physical instances within the cluster at the application level.

Support of Logical Clusters

The workload management system and methodology of the present invention enables a physical cluster to be virtualized into many logical clusters that are exposed to the applications using the SDC. Logical clusters allow administrators to virtualize a set of resources within a physical cluster into multiple logical clusters that are available to different client domains. This allows a cluster to be partitioned among several applications, each with their own set of resources, service level agreements, and failover rules. The result is a system where different workloads can be safely brought together and independently managed.

A key benefit of logical clusters is that they provide for service-oriented workload management. Client connections using a logical cluster can be managed as a group. If an instance the logical cluster is running on needs to be taken down for maintenance, the entire group of connections can be migrated to a new instance. In the event a logical cluster has failed over to another instance where it is now running with another logical cluster, the solution has the capability to failback only those connections associated with the failed over logical cluster while leaving the other logical cluster alone. In the event a logical cluster of high business priority has failed over to another instance where a logical cluster of low business priority is running, the administrator has the ability the turn off service to the lower priority application. The ability to subdivide the cluster is important for customers wishing to consolidate multiple applications. Additionally, by partitioning the workload better performance and scalability can be achieved through reduced buffer transfer and an overall decrease in messaging.

For environments where a single well-partitioned application wishes to run across the cluster, logical clusters allow for effective routing of client connections to individual instances with client to instance affinity and full failover support. Each logical cluster can have its own set of failover rules allowing for different availability policies on a per application basis. An administrator can also establish load profiles to define which aspects of system load are important to an application. These profiles are associated with logical clusters. They also describe how the system should react to differences in load amongst the cluster members. The workload manager uses a collection of routes, logical to physical mappings, load data, and profile configurations to distribute load throughout the cluster as hereinafter described in more detail. This includes both login time load balancing as clients login to the database system as well as dynamic load distribution in response to workload imbalances during system operation.

Login Time Load Balancing

The workload management system of the present invention provides for incoming client connections to be routed to these logical clusters based on rules defined by the administrator. The association of connections to logical clusters is logical. The association of logical clusters to physical cluster instances is used to physically connect the clients to the database system.

Dynamic Load Distribution

In addition to login time load balancing, the present invention also includes features which enable workload to be dynamically distributed amongst nodes of the cluster. The present invention enables users to define a variety of load profiles which may operate based on a number of different metrics. Different load profiles can be defined for each application, with each profile having its own set of weights that determine which metrics are important, and thresholds that describe how the system should react to differences in load between cluster instances. These profiles are assigned to logical clusters, allowing different logical clusters (i.e. applications) to view and respond to load differently. The system also incorporates other improved load balancing features. It provides metric values that are trended and represent moving averages instead of merely using instant values. In addition, it includes a mechanism enabling an administrator to input his or her own metric(s), such as an external response time monitor which is then considered by the workload manager in balancing workload amongst nodes of the cluster.

Benefits of Effective Workload Management

Effective workload management provides the following benefits to SDC database implementations:

1. Workload Consolidation: Multiple workloads or applications may be effectively consolidated to a single SDC system. Cost and consistency are the primary motivators for workload consolidation, and the availability aspects of a SDC make it a particularly appealing platform for such a move, because each node in a cluster can back each other up. Applications from many different systems can be consolidated to a single cluster, each given their own "home" node or nodes. Should the home node(s) for one application fail, the other nodes can provide service. The workload management features of the present invention allow administrators to setup a logical cluster for each application being consolidated with the ability to provide resources on an application-by-application basis.

2. Workload Isolation: Multiple workloads running in the same system are isolated from each other. The motivators are service level agreements and security. Logical cluster capabilities allow different applications to run in their own virtualized cluster, allowing for the implementation and monitoring of service level agreements (SLAs) on a per application basis. Resources can be dedicated to specific applications, keeping a spike in one application from stealing resources from another.

3. Workload Migration: Workload migration is frequently done to bring a node offline to perform maintenance. Using ASE's connection migration and logical cluster functionality administrators will be able to move existing connections, individually or as a group, from one node to another. The present invention also includes both login time and dynamic load balancing for features for moving workload from one resource to another. These features enable the system to automatically make adjustments in response to imbalance in workload amongst nodes of the cluster. The architecture of the workload management system of the present invention and its core subsystems will next be described.

System Architecture and Components

Fully Distributed Architecture of Workload Management System

Figure 4A:
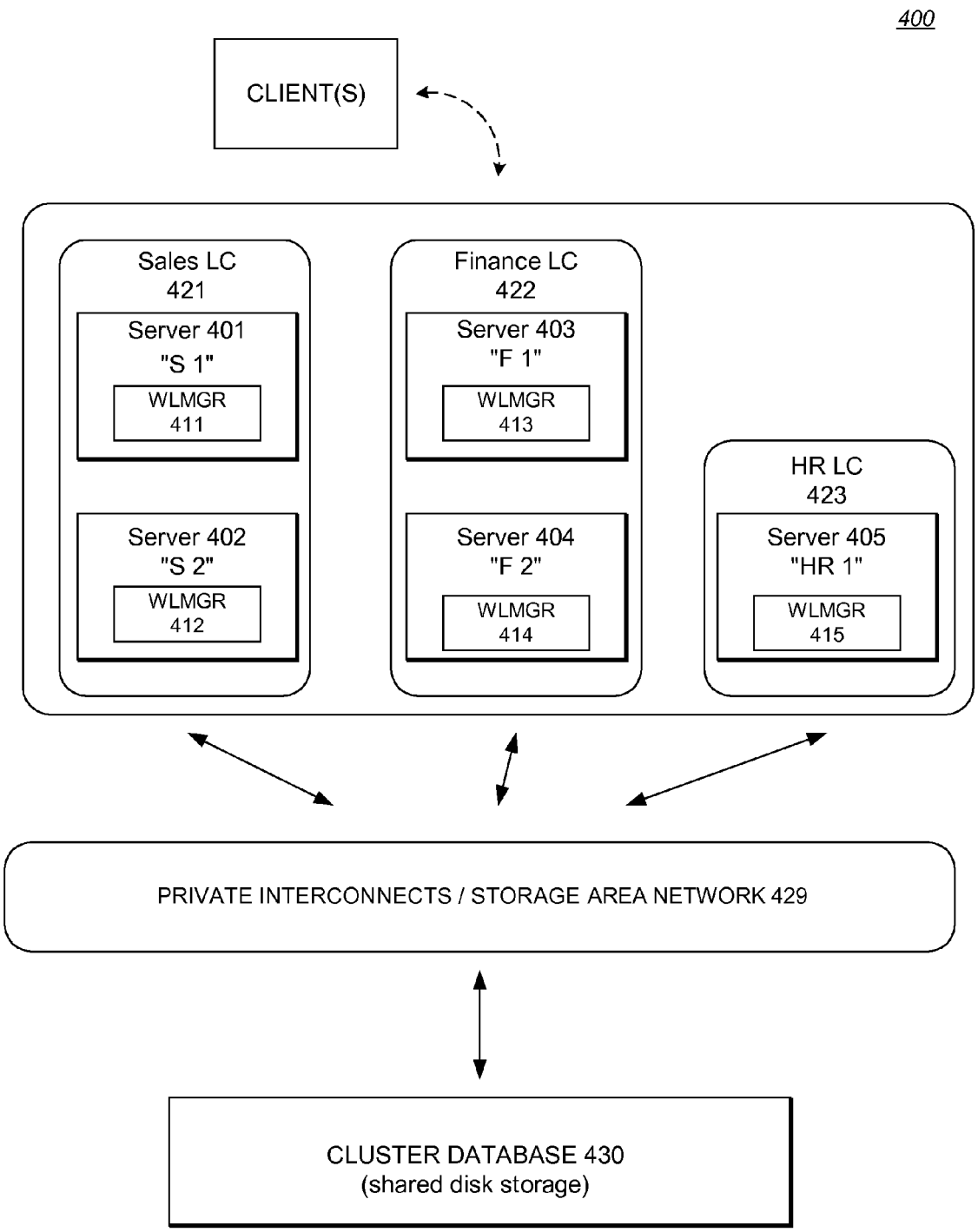
FIG. 4A is a high-level block diagram of a cluster environment in which the workload management system of the present invention may be implemented.

The workload management system of the present invention uses fully distributed/replicated meta-data and state machines. FIG. 4A is a high-level block diagram of a cluster environment 400 in which the workload management system of the present invention may be implemented. As shown, environment 400 comprises a cluster of five server nodes (Servers 401, 402, 403, 404, 405) connected to each other and sharing access to cluster database 430 via private interconnects and SAN 429. Essentially, a mirror of the workload manager is running on each member of the cluster. As shown, workload managers (wlmgr) 411-415 are running on Servers 401-405, respectively. Although not separately shown at FIG. 4A, it should be noted that nearly all the workload manager data is stored at each node of the cluster. Generally, the only exclusions are local, transient items of data which only affect one node, such as the number of users currently on a given node. The workload management system is optimized for read access. No cluster locking or messaging is required to read as these events occur frequently. Writes (e.g., due to action by the administrator or reconfiguration of the physical cluster) are much less frequent and are synchronously distributed.

The fully distributed architecture of the workload management system provides several advantages. First, it facilitates recovery in the event of failure of a node of the cluster. There is no need to worry about lost data, as all significant data is replicated to each node. Thus, after recovery the system can be rebuilt from data that had been copied to other nodes. Another advantage of the approach is that it provides a single system image for monitoring and management. The workload manager can be accessed and configured from any of its nodes. Data which is stored on disk inherits the single system image capabilities of the underlying distributed DBMS. Distributed meta-data and state machines also allow reporting and monitoring from any cluster member. The interface of the workload manager is "location agnostic" and can be run from anywhere. For example, the configuration can be changed by commands issued from any node of the cluster. The system does not rely on a central manager node. In monitoring workload, the workload manager does need to collect and aggregate a small quantity of data (e.g., local user counts on each node) and report this information back via the API so that relevant information for monitoring workload can be made available to all nodes.

The organization of logical clusters is also shown at FIG. 4A. As shown in this example, servers in the cluster are organized into three logical clusters: sales logical cluster 421, finance logical cluster 422 and HR logical cluster 433. A key benefit of logical clusters is that they provide for service-oriented workload management. Applications using a logical cluster can be managed as a group. If server 401 (instance "S1") on which the sales logical cluster 421 is running needs to be taken down for maintenance, the entire group of clients connected to server 401 can be migrated to another instance (e.g., server 402 (instance "S2"). The logical cluster may also be defined in such a manner that it will failover to another logical cluster (e.g., failover of the Sales logical cluster to Servers 403 and 404).

In the event a logical cluster has failed over to another instance where it is now running with another logical cluster, the system has the capability to failback only those connections associated with the failed over logical cluster while leaving the other logical cluster alone. In the event a logical cluster of high business priority has failed over to another instance where a logical cluster of low business priority is running, the administrator has the ability the turn off service to the lower priority application, if desired. The ability to subdivide the cluster is also important for users wishing to consolidate multiple applications. Additionally, by partitioning the workload better performance and scalability can be achieved through reduced buffer transfer and an overall decrease in messaging.

Logical Cluster Stored Procedure

A logical cluster may be created using the logical cluster stored procedure "create" command with the following syntax:

sp_cluster logical, "create".

For instance, to create the three logical clusters "SalesLC", "FinanceLC" and "HRLC" as shown at FIG. 4A, a user or administrator can enter the following:

sp_cluster logical, "create", SalesLC
sp_cluster logical, "create", FinanceLC
sp_cluster logical, "create", HRLC Adding Instances to Logical Cluster Instances may be added to a logical the cluster using the logical cluster stored procedure "add" command. For example, to add two instances to the "SalesLC" a user or administrator may enter:

sp_cluster logical, "add", SalesLC, instance, Server 401
sp_cluster logical, "add", SalesLC, instance, Server 402

Adding Routes to Logical Cluster

The sp_cluster logical "add" command may also be used to route clients to a target logical cluster. For example, to route the applications "field_sales" and "sales_reports" to the Sales logical cluster (SalesLC), a user may enter:

sp_cluster logical, "add", SalesLC, route, application, "field_sales;sales_reports"

Attributes of Logical Clusters

A logical cluster possesses a set of attributes, or properties, that control different aspects of logical cluster behavior. Each attribute has a default value. Users can accept the default value or change it to best their application environment. Users may view the current settings for logical cluster attributes, using sp_cluster logical, "show" and can also use the sp_cluster logical stored procedure to manage the following attributes:

Open attribute—specifies the logical cluster to which clients without a specific routing plan are directed.

System view—specifies whether monitoring and informational tools such as sp_who, sp_lock, and monitoring tables describe an instance in the cluster or the whole cluster Startup mode—specifies whether a logical cluster must be started automatically or manually.

Down-routing mode—specifies how client connections are routed if the logical cluster designated by the routing rule is not available.

Failover mode—how and when failover instances are brought online

Fail-to-any attribute—specifies whether any instance can be a failover resource or only a designated instance can be a failover resource Load profile—provides a series of weighted metrics for determining the relative workload on an instance in the logical cluster.

Login distribution mode—specifies how ASE distributes connections when a logical cluster spans multiple instances.

Components of Workload Manager

Figure 4B:
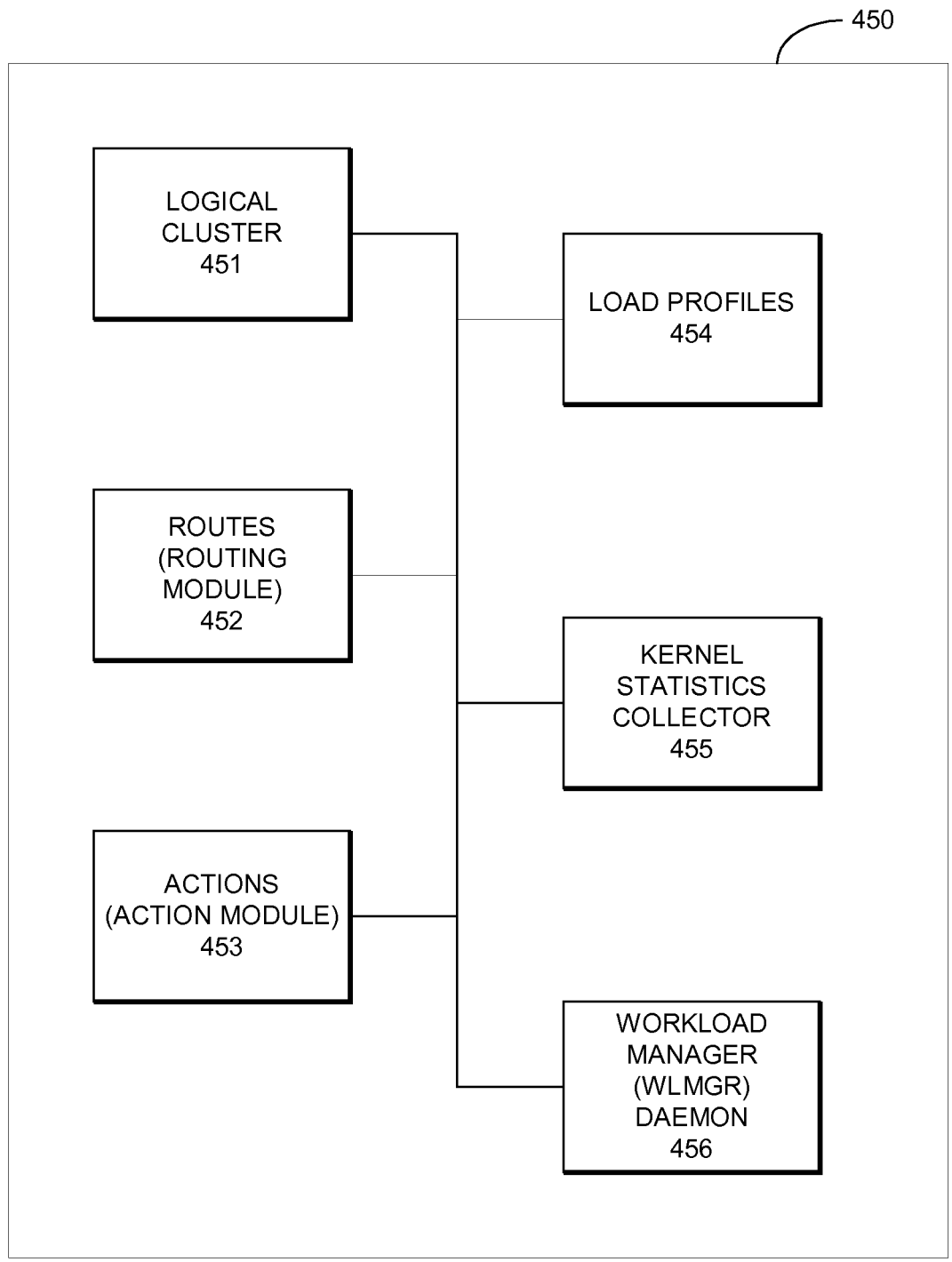
FIG. 4B is a high-level block diagram illustrating components of the currently preferred embodiment of the workload manager of the present invention.

FIG. 4B is a high-level block diagram illustrating components of the currently preferred embodiment of the workload manager 450 of the present invention. As shown, in its currently preferred embodiment, the workload manager 450 is implemented in six modules or entities: logical cluster 451, routes (routing module) 452, actions (action module) 453, load profiles 454, kernel statistics collector 455 and workload manager (wlmgr) daemon 456.

The logical cluster 451 is the primary entity in workload management system and represents an application within the cluster. The logical cluster is implemented as an abstraction layer above the actual cluster and is modified and managed by failover and failback commands and the like (e.g., to reflect loss of cluster members) through a management interface that defines resources of a logical cluster and sets its properties.

The routing module (routes) 452 describes the relationship between a connection attribute and a logical cluster. Routes currently operate based on a login name, an application name, or a server (alias) name that the client has requested to connect to. An administrator defines a route for associating a connection with a logical cluster. For example, a cluster may have a "Sales" application which is running on a Sales logical cluster. If a user signed in requesting a "Sales" server, the route enables this connection to be recognized and routed to the Sales logical cluster.

A user or administrator can use the action module (actions) 453 to issue administrative commands against logical clusters. Examples of administrative commands that may be issued include failover, failback, offline and migrate. The action module 453 does not merely run commands, but also allows for asynchronous commands. For example, an administrator can issue a command at noon indicating that a node (instance) of the "Sales" logical cluster will be taken offline and failover to another node at 4:00 pm that day. The action module 453 tracks the command deadline and state transitions and attempts to gracefully transition the workload from the first node to the second node prior to the deadline as existing transactions commit. When the deadline is reached, any remaining work will be terminated. This action feature enables an administrator to issue commands which will be effective at a future time, so as allow clients some time to complete existing work and thus provides a more graceful transition. It should be noted that information about an action that is issued on one node is replicated to all nodes of the cluster, so that each cluster member has knowledge of it. A given node might (or might not) have any work to do in response to a given action, but the information is replicated to all nodes in keeping with single system image architecture of the workload management system of the present invention. Generally, transient actions such as these actions are not written to disk as the information is replicated to other nodes. A reason for this is that the actions would only be lost if the entire cluster went down and in that situation the actions would not be relevant anyway. Accordingly, the overhead involved in writing this information to disk is avoided, thereby improving system performance.

Load profiles 454 are created and used for workload monitoring and distribution. The load profile module 454 provides several internal metrics to monitor load, including CPU usage, percent of user connections in use, run queue lengths, disk I/O, and the like. One of the metrics is a "user" metric which allows a user to create a custom metric that is used by the system. For example, a user may be concerned about response time of the system. It is difficult for the database internally to determine the response time for a query. The present invention includes a "hook" which allows a user or administrator to define a custom metric, such as one based on running a query and measuring its response time. This information can then be fed back to the workload manager enabling the system to take action if appropriate based on this metric. Thus, feedback about system performance can be generated and fed back to the system and considered in load distribution adjustments. Response time is only an example of a custom metric that can be created using the present invention. The above-described "hook" also allows users to define and plug in (i.e., incorporate) other custom metrics, as desired.

Load profiles also allow a user or administrator to assign weights to these metrics to indicate which metrics are more important to a given application in a given implementation environment. As an example, an OLTP profile, for instance, typically assigns heavy weighting to the run queue length with some weight also on disk I/O and CPU usage. A DSS profile, in contrast, usually assigns heavy weighting to distribution of user connections. In this manner, load profiles provide more fine-grained controls to adjust workload based on factors relevant to each application.

Load profiles also include thresholds which describe how applications should react to load imbalance. These thresholds are user configurable. Currently, three different thresholds are utilized. The first or base threshold is a floor that must be reached before additional action taken. For example, if utilization on one node is 1% and on another it is 2%, then it is generally not useful to perform the processing necessary to attempt to redistribute workload between the nodes. A second threshold is referred to as a "login" threshold which is used for purposes of determining, at login time, whether the difference in workload between nodes is such that it is appropriate to consider redirecting a connection to another node that is operating under a lesser load. For example, assume the login threshold is ten percent (10%). If the load measured at node F1 is more then 10% higher than the load measured at node F2 of the "Finance" logical cluster (and assuming the workload is also above base threshold), then the connection is generally redirected to node F2, even though it could be run at node F1. The third threshold is a dynamic load distribution threshold which has its own dynamic threshold. When, for example, a new query batch is received at a given node (e.g., node F2) and the load at that node exceeds the load at another node (e.g., node F1) in the logical cluster by the dynamic threshold, then connections may be migrated to the less-loaded node (node F1 in this example). One reason for having different thresholds for login and dynamic load distribution is that dynamic load distribution involves more "expensive" operations (in terms of impact on system resources and performance) and thus it is advisable only to perform these operations when the workload distribution is significantly unbalanced.

The present invention also includes a set of standard load profiles (e.g., standard OLTP and DSS profiles) that can be utilized by users and administrators. The standard load profiles are standard templates which include weighted metrics and other settings and properties. These standard profiles provide a starting point for a user or administrator to implement load profiles with suggested thresholds and values for certain common types of applications. These standard profiles can be utilized and/or customized and applied to applications on a per application basis. Alternatively, users can create their own custom profiles to meet their own requirements, as desired. A given cluster could, for example, have three OLTP applications that use the same OLTP profile and two primarily read-only applications that utilize two variations of a read-only profile.

Two additional modules of the workload management system are the kernel statistics collector 455 and the workload manager daemon 456. The kernel statistics collector 455 is a low level component that has no direct interaction with users. The module runs in the system's interrupt context based on a periodic "clock-tick" received from the operating system (e.g., every five seconds). Inside the interrupt the kernel statistics collector 455 runs samples and updates raw load statistics on a per engine (ASE process) basis. The kernel statistics collector maintains running averages of statistics such as CPU utilization, disk I/Os per second, and the like. This data generated by the kernel statistics collector is used by the load profile subsystem 454 when it performs its load calculations. The load system runs periodically and obtains per-engine statistical information from the kernel statistics collector, aggregates it to generate values for the instance and then publishes and distributes the information across the entire cluster.

The workload manager (wlmgr) daemon 456 is a database system task that runs on each instance (i.e., each node in the cluster). The wlmgr daemon 456 executes code related to load calculation and distribution of load data. The daemon also handles asynchronous execution of actions. For example, consider the previously discussed situation where a node is being taken offline for scheduled downtime and an administrator issues an action at noon which is to be effective at 4:00 pm. In the administrator's context, the state transition is performed, the action is staged to all nodes and then an event is posted out to the workload manager daemon 456 that indicates the wlmgr daemon needs to take the action. In response, the wlmgr daemon will wake up and examine the action and the daemon context will start marking the connections that are to be migrated to other nodes. In addition, the routing module 452 will know that a node is to be taken offline and will not direct any new connections to the node that is being taken offline. The workload manager daemon will wake up again at the designated time (e.g., 4:00 pm in this example) to terminate any connections remaining on the node being taken offline. Administrators can modify or cancel an action as actions are not simply of a "fire and forget" nature. For instance, if a lot of work is still pending at 3:50 pm, the administrator may cancel or delay the action (e.g., to 5:00 pm) so as to avoid killing tasks that are in process of performing important work.

Other ASE Cluster Components

The workload manager is a high-level module which works in conjunction with other ASE modules in a Shared Disk Cluster environment. In its presently preferred embodiment, it relies on other ASE cluster components (not shown at FIG. 4B) for messaging, cache coherency, and synchronization. One of these other components is the cluster event system (CES). CES is a subscribe/publish mechanism used to post events to interested processes cluster-wide. For instance, the wlmgr daemon listens for wlmgr events triggered by administrative commands. In response to a failover logical cluster command, a wlmgr event is posted which will wake up the wlmgr daemon and the daemon will receive the event indicating certain action(s) should be taken.

Other ASE modules utilized in the currently preferred embodiment include the peer coordination module (PCM) and the object coherency manager (OCM). PCM is a cluster-wide remote procedure call (RPC) mechanism for triggering action on another instance. For example, when an administrator creates a new logical cluster on one instance, wlmgr will issue a remote procedure call via PCM to trigger the creation of the related data structures on other cluster members. The object coherency manager (OCM) combines PCM/RPC with a distributed cluster lock manager and is used for meta data coherency and synchronization. The OCM blocks reads while writes are in progress and propagates the changes across the cluster. For instance, logical cluster states are protected with OCM locks. If the state of a logical cluster is being changed, a cluster wide exclusive lock (OCM lock) is obtained on the logical cluster state. After the change is made the data is pushed out and replicated to other cluster members. Some examples of operations of the workload management system and the interaction amongst its subsystems will next be described.

Interactions Amongst Workload Manager Components and Data Structures

Ordered List of Network Addresses Used for Redirection

Each logical cluster maintains a list of network addresses of clustered instances that are running in that logical cluster. These network addresses are used when clients connect into the database system. If a client needs to be redirected to another instance (e.g., because of imbalanced load), the network addresses are sent to the client so that the client can connect to the appropriate node. For failover purposes, clients are also given a list of addresses they can use in the event that they are disconnected. Accordingly, each logical cluster maintains its own network list, with the list ordered based on which instances are participating in that logical cluster, their relative loads, which nodes are configured as failovers and so forth. The approach is to try to provide clients with an ordered list of the best instances to which they can connect, with backups provided in the event of system failure.

During load recalculation, the workload manager daemon examines raw kernel statistics (collected by the kernel statistics collector) and publishes aggregated statistics as previously described. Each cluster member will then go through each of the load profiles that has been configured and calculate scores for that profile based on the statistics. When the load profile is updated (or in the event an administrator reconfigures the load profile), any logical cluster using that profile will recompute its network address list (or redirect list). One factor that is used in generating the list is the relative load at each node. Nodes in the logical cluster operating under the lowest loads are placed towards the top of the list. The system can also update the clients with this network address information so that if the node that the client is currently connected to fails, the client will be redirected to the least loaded node.

It should be observed that logical clusters generally consult their load profiles in three different situations. During failover load profiles are checked as instances with the lowest loads are preferred as failover targets. Another case is when the database system (ASE) receives a new query batch from a client. In this situation, the load profiles are checked to see if the queries should be executed elsewhere (i.e., on another node). This is described in more detail in the discussion of dynamic load distribution (DLD) in this document. The third situation is the one discussed above in which the logical cluster generates its network address list (redirect list) for connection routing and failover. As described above, the load profile is consulted and instances with the lowest load are preferred over those with higher loads.

Applying Asynchronous Actions to Logical Clusters

Actions can post offline (or asynchronous) events against logical clusters, such as the example of taking a node offline at a future time which has been previously discussed. In response to the issuance of this action (e.g., at noon) the logical cluster will go into a "timed wait" state in which the action goes to sleep until all users disconnect from the instance or until the specified time limit has expired (e.g., at 4:00 pm). The system will monitor existing connections and look for them to disconnect. Once the local usage count (connection count) reaches zero, the action will be woken back up by the logical cluster. Here, the logical cluster subsystem communicates with the action subsystem to let it know that all connections have been migrated. For example, if the local connection count reaches zero at 3:00 pm, the action communicates with workload managers on other instances. If all the instances on which the action had to run have taken all necessary steps required by the action, the action will consider itself complete, mark the completion time, update its meta data and then complete.

Routing and Distribution of Connections at Login Time

During login incoming connections are resolved to routes and then to logical clusters. At login time the routing module is activated to determine which logical cluster the client will resolve to and which instance it should run on. For example, if a client login is requesting the "Sales" server, the routing module will look in the routing hash tables and determine that the connection should go to the Sales logical cluster. The routing module then interacts with Sales logical cluster state machine to see if logical cluster is online, and if it is accepting connections locally. If the logical cluster is not running on the instance that accepted the connection, the connection will be redirected to another instance of the logical cluster. If the connection cannot be serviced locally, the routing module sends the client a list of network addresses (redirect list) from the logical cluster. As described above, this redirect list is prepared based, at least in part, on relative loads for the instances on which the logical cluster is running.

If the logical cluster is running locally (i.e., on the instance that accepted the connection), the load profile will be consulted to determine if another node in the logical cluster has a lower workload and, if so, whether the difference exceeds the login threshold described above. If the loads on nodes of the logical cluster are sufficiently imbalanced (i.e., if both conditions are true), the routing module will redirect the client to the node with the lower workload, even though the connection could have been hosted locally.

Routing and Logical Cluster Attribute

Logical clusters also have an attribute that indicates to the routing system how to handle situations in which the logical cluster is down or the client cannot be routed to the logical cluster. Currently, certain older clients do not support redirection and thus are not routable within the cluster. To address this situation, an attribute tells the routing subsystem how to react in such a case. It may, for example, indicate to accept the connection locally or it may provide for disconnect the client if it cannot be connected to the proper logical cluster. Alternatively, the attribute may designate a default logical cluster that can be used if, for instance, the client requests a connection to the Sales logical cluster and the Sales logical cluster is down.

Load Profiles and Dynamic Load Distribution

In addition to login time load distribution, load profiles may also be consulted when a new query batch is received from a client. If the client supports migration, the load profiles will be quickly consulted to determine whether a dynamic threshold has been configured for dynamic load distribution and, if so, whether the threshold has been exceeded because the load on the local node is significantly greater than that on another node which is available for running the query. In this case, the workload management system performs several operations for determining whether or not to dynamically distribute workload by migrating the connection to another node of the logical cluster. Currently, the system examines not only the current load statistics but also considers the effect of other migrations that have occurred and predicts the anticipated load as of the next time the statistics will be recomputed in making the decision as to whether or not to migrate the current connection.

Reconfiguration of Logical Clusters on Failover

Another element of the system that is of interest is the manner in which logical clusters are reconfigured when a failover occurs. This involves an interaction between the built in cluster membership management of the currently preferred embodiment of the SDC database system and the workload manager subsystem. The cluster membership management system indicates that an instance of the cluster is offline. In response, the workload manager reconstitutes the workload manager subsystem itself to make sure it is intact and then goes through each logical cluster and applies failover rules and failover logic to those logical clusters that were running on the instance that failed so as to reconfigure any logical cluster(s) running on the failed instance.

Other Interactions Among Modules of Workload Management System

Various other interactions amongst modules of the workload management system occur in response to user input or to events occurring during runtime operations. Examples include the following:

Actions resulting from administrative commands such as failback impart state changes on logical clusters.

Actions are initiated by administrators in the context of their connection are executed asynchronously in the context of the wlmgr daemon. When an action is issued the admin context does all the setup but posts an event for the daemon to execute the action.

The wlmgr daemon is responsible for running most actions and responds to execute, modify, and cancel events from the admin context. The wlmgr daemon also responds to the expiration of action deadlines as previously described.

Workload Management Data Structures

Figure 5:
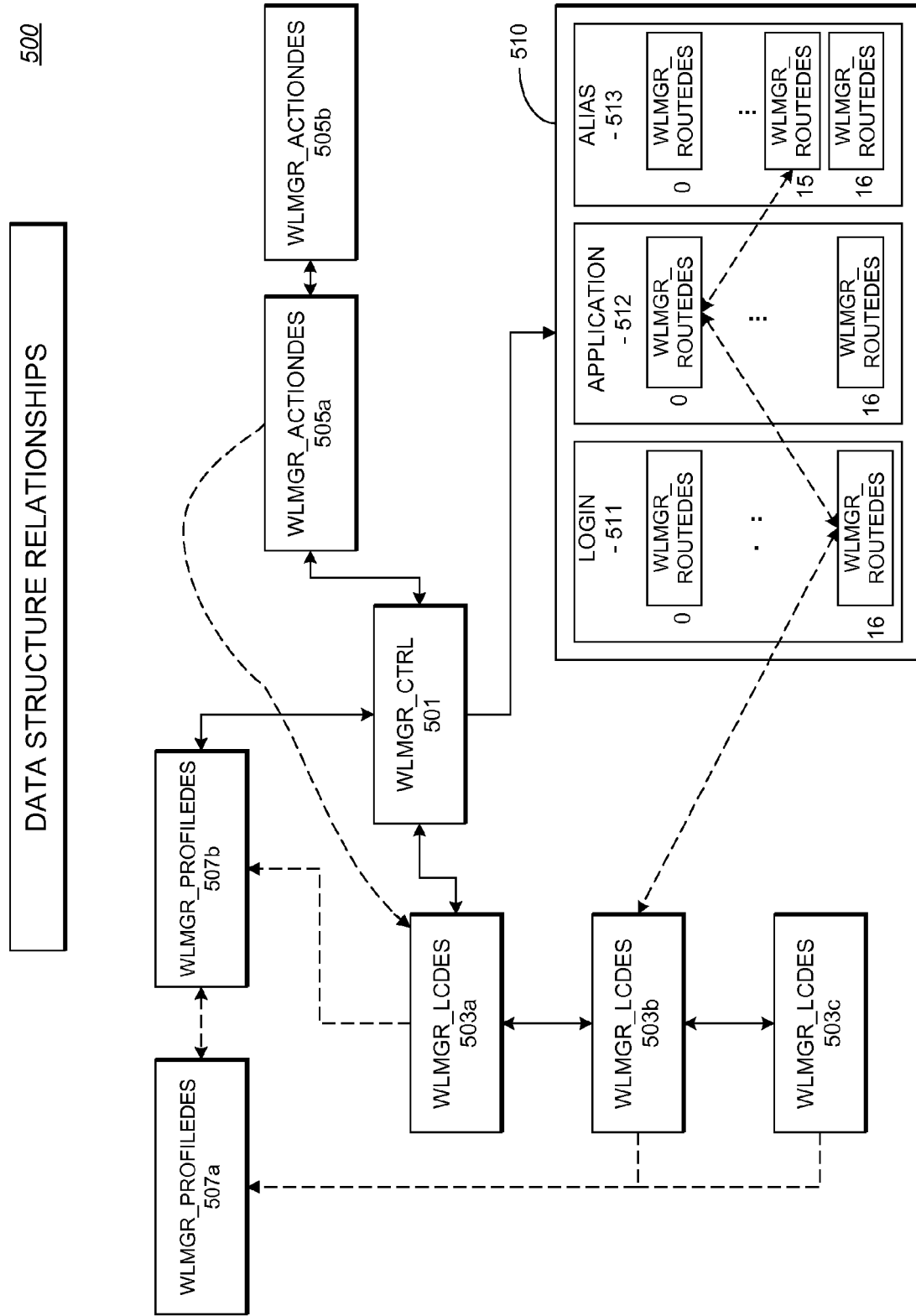
FIG. 5 is a block diagram illustrating core data structures of the workload management system of the present invention.

FIG. 5 is a block diagram 500 illustrating core data structures of the workload management system of the present invention. These data structures are maintained on each instance of the cluster. It should be noted that FIG. 5 is an example, and the number of several of the different types of data structures will vary from instance to instance and amongst different implementations. In the example shown at FIG. 5, the data structures include the following: WLMGR_CTRL (workload manager control) 501, WLMGR_LCDES (logical cluster descriptor) 503*a*, 503*b*, 503*c*, WLMGR_ACTIONDES (action descriptor) 505*a*, 505*b* and WLMGR_PROFILEDES (profile descriptor) 507*a*, 507*b*. Also shown is a Routing Hash Table(s) 510 which comprises, in essence, three separate hash tables: Login 511, Application 512 and (Server) Alias 513. Each of the hash tables 511, 512, 513, in turn, includes buckets for up to seventeen (numbers 0 to 16, as shown) route descriptors (WLMGR_ROUTEDES). Each of these data structures will be briefly described in turn.

WLMGR_CTRL is the central (master) data structure for the workload manager subsystem. There is only one WLMGR_CTRL structure per cluster instance (member) which contains or tracks the following:
  Overall wlmgr state/state on this instance
  List head for other structures
  Routing hash table(s) to resolve incoming connections to routes to logical clusters
  Raw load statistics for each instance WLMGR_LCDES is the logical cluster descriptor data structure. There is one such WLMGR_LCDES structure for each logical cluster on each cluster instance. The data structure contains:
  An array of state values, representing the overall logical cluster state and the state of this logical cluster on each cluster instance
  Bitmaps that indicate which cluster instances configured as primary (base) instance and failover instances are currently in use
  Pointers to network addresses clients can use to talk to this logical cluster (used when clients must be re-routed in the cluster)
  Pointers to the profile used by the logical cluster
  Properties/attributes of this logical cluster The WLMGR_PROFILEDES structure caches a profile definition from disk. Changes to the on disk configuration are propagated throughout the cluster. There is one WLMGR_PROFILEDES structure for each defined profile per instance. It should be noted that the same profile may be used by more than one logical cluster. A logical cluster using a profile has a pointer to the profile in the WLMGR_LCDES data structure as described above. The WLMGR_PROFILEDES includes the following:
  A definition that includes various metric weights and thresholds
  A table of the current value of the weighted metrics on each cluster instances
  An array of load scores (sum of all weighted metrics) for each cluster instance.
  A list of cluster instance ids order by lowest to highest load.

WLMGR_ACTIONDES is an action descriptor data structure. One action descriptor data structure is created on each cluster instance for each issued administrative action. The data in this data structure is entirely transient and is not stored on disk storage. It tracks the exact command or subcommand being run (e.g., failback logical cluster Sales from instance S2 to instance S1). It also tracks the time the command was issued, wait option requested, and command deadline (e.g., issued at 12:00 noon and wait until 4:00 pm for it to complete). In addition, it includes a pointer back to the logical cluster instances where the action is being executed.

The WLMGR_CTRL data structure also provides access to the Routing Hash Table(s) 510 as shown. This includes three separate hash tables which are referred to collectively as the "routing hash table". One hash table is included for each of the following types of routes: login name (Login 511), application name (Application 512), or server alias (Alias 513).

Each hash table has seventeen "buckets" for WLMGR_ROUTEDES data structures. There is one WLMGR_ROUTEDES data structure per defined route on each cluster instance. The WLMGR_ROUTEDES (routes) data structure primary serves as a cache of on disk data with a small amount of cluster-wide state data. This data structure contains the following:
  Type: what kind of route this is (i.e., login name, application name or server alias)
  Key: key value (i.e., the login name, application name or alias)
  Logical Cluster: where the type-key should route to (e.g., to Sales logical cluster)
  State: uses during create/drop to indicate that this route can be used or should be ignored.

Routes are linked to form a hash overflow chain. Routes in the chain are all of the same type and hash to the same bucket. As shown at FIG. 5, routes are also linked to other routes belonging to the same logical cluster, so that the logical cluster in essence has a chain of routes that are hanging off of it. For example if the login is "Sales user", the application is "Sales application" and the alias is "Sales server", all routed to Sales logical cluster, these three routes are linked together to enable traversal of all routes of a given logical cluster (e.g., as a lookup mechanism).

The order of precedence is login, followed by application and then alias. So when a connection comes in, the login name is hashed and a check is made in the Login hash table 511 for a matching route. If no match is found, the application name is hashed and Application table 512 is checked. If no match is found the server (alias) name is hashed and matched against Alias hash table 513. When a match is found, the route descriptor will point to a particular logical cluster and will use that as the target. If there is no match in any of the hash tables, the connection will be directed to a default logical cluster (sometimes referred to herein as the "open" or "system" logical cluster). It should be noted here that there is always one logical cluster called the system (or open) logical cluster that is essentially a mirror of the actual underlying ASE cluster. Thus, before any other logical clusters are configured, a system logical cluster already exists out-of-the-box to represent the overall shared disk cluster.

Cluster and Instance States

The logical cluster and each instance in the logical cluster can have different states. A logical cluster has an overall, or global, state that determines, for example, whether the cluster is offline or online. A logical cluster also has an instance state that describes the state of a particular instance as it is perceived by the logical cluster. For example, an online logical cluster may be online on its base instances and offline on its failover instances. This state may be independent of the actual ASE state as a logical cluster may be offline on an instance that is actually up and running. The following describes each state at both the global and instance levels.

Online:
  Global: At the global level, the logical cluster is online and running on one or more instances.
  Instance: At the instance level, the online logical cluster is accepting and managing connections on the current instance.

Offline:
  Global: The logical cluster is not running on any instance.
  Instance: The logical cluster is not running on the current instance, which cannot accept connections or consume resources.

Inactive:
  Global: Similarly to the OFFLINE state, the logical cluster is not running on any instance. INACTIVE logical clusters are not started automatically and do not participate in failover. The cluster achieves the INACTIVE state only through the deactive command. Once INACTIVE, the cluster comes ONLINE only through the online command.

Instance: The logical cluster is not running on the current instance, which cannot accept connections or consume resources. In addition, the INACTIVE instance cannot failover and is not brought online after an automatic startup. This state is achieved only via the deactivate command.

Failed:

Global: Similar to the offline state, the logical cluster is not running on any instance. A logical cluster moves to the FAILED state when its active instances are shutdown with nowait or encounter a system failure when no failure resources are available.

Instance: The logical cluster is not running on the current instance, which cannot accept connections or consume resources. The FAILED state is reached via a shutdown with nowait or system failure Timedwait:

Global: A transition state between ONLINE and OFFLINE or INACTIVE. An ONLINE logical cluster must enter the TIMEDWAIT state before becoming offline or inactive. During this time, any new connections are routed according to the down-routing mode, and existing connections migrate or disconnect.

Instance: A transition state between online and offline or inactive. When a logical cluster is online for an instance, it must enter the TIMEDWAIT state before becoming offline or inactive. In the TIMEDWAIT state, no new connections can be routed to the logical cluster or instance, but existing connections continue to run until they migrate or disconnect.

Logical Cluster Commands

Logical clusters have a set of commands, also referred to as actions, which can be performed against them. These commands can be used by the administrator to online or offline the logical cluster, perform a failover or failback, and several other operations. The following describes the commands available in the presently preferred embodiment:

Create Command: The create command creates a new logical cluster. The logical cluster is given a system generated ID. The new logical cluster has no instance or failover resources, no routes, and a default set of attributes. It will be offline.

Online Command: The online command brings logical cluster ONLINE on a set of instances. It can be used in three ways: (1) to online a logical cluster that is currently OFFLINE on all of its base instances, (2) to online a logical cluster on a specific set of base or failover instances, (3) to online an already ONLINE logical cluster on all base instances where it is OFFLINE.

Offline Command: The offline command stops a logical cluster on all of its instances or a specific set of instances. It can be run against instances that are ONLINE, FAILED, or INACTIVE. Special semantics apply to the offline command that dictate how existing connections are handled.

Deactivate Command: The deactivate command is identical to the offline command, with the except that the final instance state is INACTIVE vs. OFFLINE. An INACTIVE instance is not eligible for failover or automatic startup. A use case would be where a logical cluster is ONLINE on a given instance that needs to be rebooted and have some maintenance performed when it reboots. The administrator could deactivate that instance so that when the instance reboots the logical cluster will not bring itself ONLINE on that instance.

Failover Command: The failover command can be used to perform an administrative failover. It has two components, both optional. The first component is a list of instances to failover from, i.e. these are currently ONLINE instances that should be brought OFFLINE. The second component is a list of instances to ONLINE. If no from instances are given, no currently ONLINE instances will be offlined. If no to instances are given, the system will employ the failover rules and configuration for that logical cluster to determine which failovers to bring ONLINE.

Failback Command: The failback command is essentially the same as the failover command, and can be used to a logical cluster back to its base instances following an automatic or administrative failover. As with the failover command, the failback command accepts option from and to instance lists.

Drop Command: The drop command drops an instance from a logical cluster, or drops the entire logical cluster. The logical cluster/instance must be OFFLINE or INACTIVE in order for it to be dropped.

Cancel and Modify Wait Commands: The cancel and modify wait command apply to logical cluster actions as hereinafter described.

State Changes

Cluster and instance states can be changed manually, when a user (or administrator) executes a state change using the online, offline, failover, and failback commands. States are also sometimes changed in response to other actions. States may also change automatically as a result of system changes. The initial state of the cluster or instance can dictate whether or not a state change is valid, and even the final state.

The logical cluster stored procedure commands deactivate, failback, failover, and offline are asynchronous. They stop an ONLINE instance that may have existing transactions. These transactions must be handled before the instance can actually be taken offline or made inactive. As a consequence, these commands can be allowed to complete at a later time and context. When any of these commands is executed, the target instance is placed in the TIMEDWAIT state, and no longer accepts new connections. Each of the asynchronous commands provides three "wait" options for handling existing transactions as follows:

wait—lets existing connections remain for a specified period of time, for example five minutes. Connections that support migration migrate as soon as they become quiescent. Connections that do not support migration disconnect when they become quiescent. HA-aware clients fail over; clients that are not HA-aware disconnect. Connections remaining after the specified time are terminated.

until—lets existing connections remain until a specified time, for example 12:30 p.m. Otherwise, until and wait handle connections in the same way.

nowait—terminates existing connections immediately. Connections that support migration must migrate immediately, or they are terminated.

When the last connection using the instance disconnects, the instance state changes from TIMEDWAIT to OFFLINE or INACTIVE.

Action Descriptors

Action descriptors enable users to track or change issued actions, such as administering failover, failback, and planned downtime. When an asynchronous command seeks to stop one or more instances, it generates an action descriptor. The action descriptor tracks the action, the wait option, and target instances in the TIMEDWAIT state. Administrators can view information about an action descriptor by querying a "monLogicalCLusterAction" table or executing the "show" command using the following logical cluster stored procedure syntax:

sp_cluster logical, "show", NULL, action

An action can be "active" or "complete". An action is active when at least one target instance remains in the TIMEDWAIT state. An action is complete when all target instances are no longer in the TIMEDWAIT state. Using the logical cluster stored procedure, users can manage action descriptors using the following options:

cancel—terminates active actions. Instances in the TIMEDWAIT state due to that action return to the ONLINE state. Existing connections remain, even if they were marked for migration or termination. If the command that resulted in the creation of the action brought instances ONLINE, they remain ONLINE. For example, if an action results in the cancellation of a failover from S1 to F1, F1 remains ONLINE.

modify_wait—can change the wait option and time associated with an active action. For example, if an action is created with a 10-minute wait, modify_wait can be used to change the time delay to 20 minutes or change the time delay to the actual clock time of 4:30 p.m. The wait option can also be changed to nowait.

release—removes a completed action from the monLogicalClusterAction table. Completed actions remain in the monLogicalClusterAction table so that users can track their status. However, completed actions consume memory from the workload manager cache. Executing the release command after an action completes enables this memory to be freed.

Managing Workload

Each instance has a workload manager thread that is responsible for calculating the load on the current instance and sending that information to the other instances in the cluster. The workload manager is a system-service thread; it is spawned when the instance boots. Workload is measured based on calculating a load score for each instance. This load score is a unitless number that can be compared with other load scores to determine relative workloads. Thus, users can compare load scores across a cluster or at different times for a particular cluster. A load score is meaningful only when compared to other load scores.

In its currently preferred embodiment, the workload manager considers five system-defined metrics and, optionally, one user-supplied metric when calculating a load score. The following are the metrics provided in the presently preferred embodiment:

User connections—the capacity of an instance to accept a new connection, based on resource availability.

CPU utilization—the capacity of an instance to accept additional work.

Run-queue length—the number of runnable tasks on a system. Run-queue length measures the processing backlog, and is a good indicator of relative response time.

I/O load—outstanding asynchronous I/Os.

Engine deficit—the difference in the number of online engines among instances in the cluster. (Note: Engine deficit is only measurable when instances in the cluster have unequal numbers of engines. In this scenario, engine deficit adds a metric for maximum relative capacity to the load score).

User metric—an optional, user-supplied metric specific to the user's environment.

Weighting and Load Thresholds

Each component of the load score is weighted according to importance. The raw numbers are multiplied by the weight, and the results are summed to give each instance an overall load score. The solution includes default values, but users may adjust the weights using the sp_cluster profile stored procedure (e.g., if including a site-specific custom metric).

Once the load score for each instance is known, the workload manager can decide how to use this information to better distribute the workload on the logical cluster. As previously described, the system can perform login redirection and/or dynamic load distribution. Generally, load distribution is performed only for logical clusters which are running on multiple instances. The approach is to redirect work when one instance is overloaded and other instances are available. The workload manager does not attempt to maintain perfectly balanced load scores, but rather includes load thresholds for login redirection and dynamic load distribution so as to only attempt to rebalance load when differences in workload between instances is significant. Users can configure the load thresholds when creating a load profile using a sp_cluster profile stored procedure.

Load profiles consolidate all configurable aspects of the workload scoring system into a single named entity. Users can assign different load profiles to different logical clusters in the same physical cluster, thus enabling multiple applications with diverse workloads within the same physical cluster. Users can also apply the same load profile to multiple logical clusters. For example, a SDC system can simultaneously host a DSS-based logical cluster that is primarily read-only and an OLTP logical cluster that handles frequent writes. The optimum thresholds for login redirection and connection migration for these two clusters may be very different. The ability to assign specific load profiles to each logical cluster allows each cluster to function more efficiently. An administrator may utilize preconfigured profiles supplied in the currently preferred embodiment of the present invention or may create custom load profiles using sp_cluster profile stored procedure.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Routing of Connection to Logical Cluster

Figure 6:
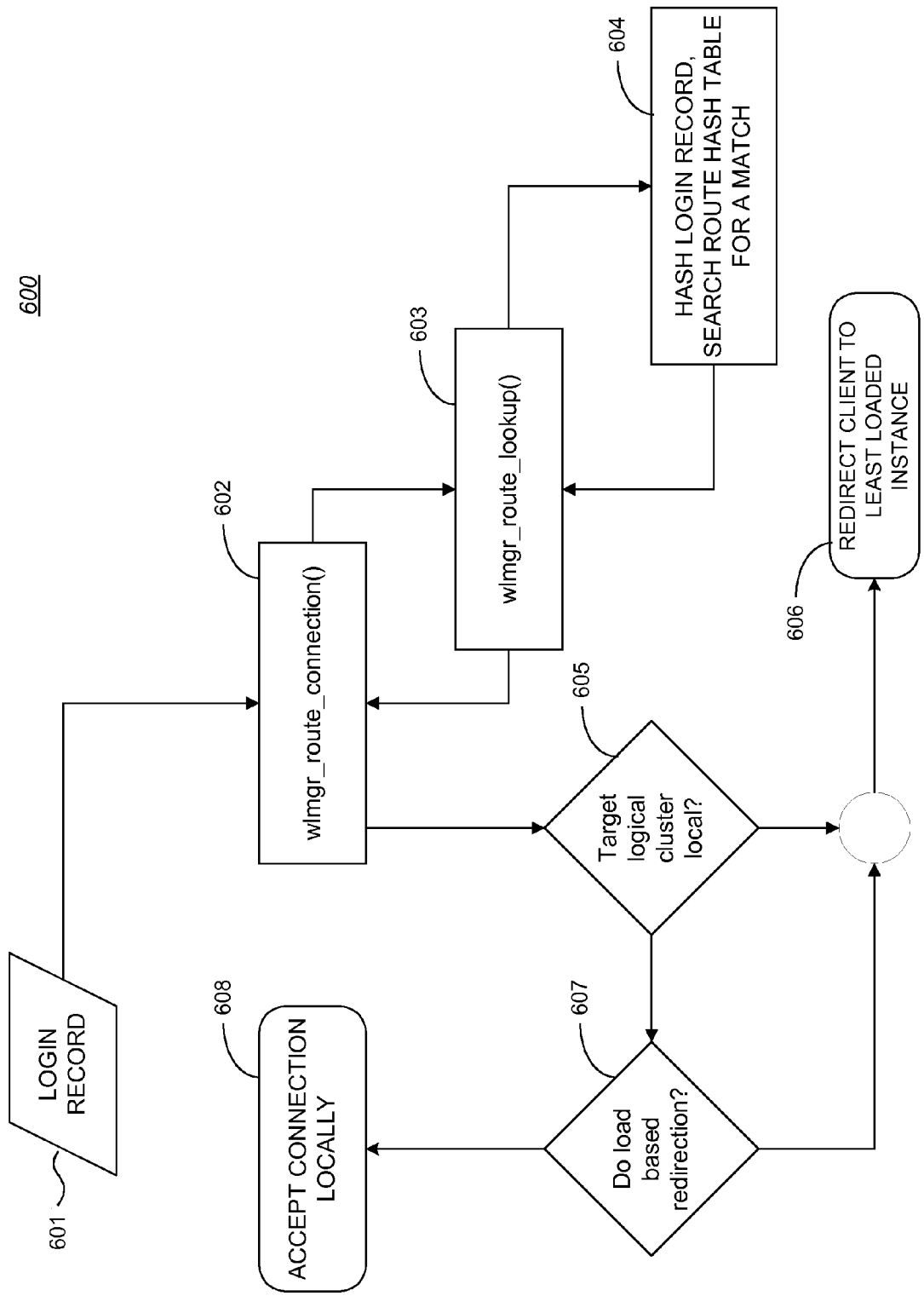
FIG. 6 is a flow diagram illustrating the routing of a connection to a logical cluster.

FIG. 6 is a flow diagram 600 illustrating the routing of a connection to a logical cluster. As shown, at 601, a client connecting to the SDC database system (ASE) sends a login record. In the first phase of login processing, a wlmgr_route_connection( ) routine is invoked as provided at 602 to identify the logical cluster to which the connection should be routed. The workload manager reads the login record and invokes a wlmgr_route_lookup( ) routine to attempt to match it with a route and therefore a logical cluster as shown at 603 and 604. As previously described, information from the login record is hashed and the routing hash table(s) are searched for a match. The matching logical cluster is returned (or the default logical cluster if no match is found).

Phase two determines whether or not the connection can be accepted locally or should be redirected. A determination is first made as to whether the target logical cluster is local as shown at 605. If the logical cluster is not local, the process proceeds to redirect the client to the least loaded instance as shown at 606. Otherwise, if the target logical cluster is local, a check is made to determine whether to do load based redirection at 607. This step involves evaluating whether there is an significant imbalance in workload between nodes which is greater than the login threshold amount. If the workload is imbalanced and the workload manager determines that load-based redirection is appropriate, the client is redirected to the least loaded instance as provided at 606. Otherwise, the connection is accepted locally as shown at 608. If the logical cluster is running on an instance other than that which has accepted the connection, or if the connection is redirected based on an imbalance in workload, the workload manager will provide the client with an ordered list of network addresses that should be used for a connection.

The following WLMGR_ROUTE_CONNECTION function routes an incoming connection to the appropriate logical cluster. A connection may be redirected to another instance as a result of this function. The input parameters to the function include a point to the PSS (Process Status Structure) for the connection to route and a pointer (ptr) to the LOGINREC for the connection to route. The function returns the id of the logical cluster that the connection is routed to (or −1 in the event of error).

```
 1:  /*
 2:  ** WLMGR_ROUTE_CONNECTION
 3:  */
 4:  int
 5:  wlmgr_route_connection(PSS *pss, LOGINREC *lp)
 6:  {
 7:      WLMGR_LOCALCTRL(wc);
 8:      WLMGR_ROUTEDATA rd;
 9:      LOCAL_INSTANCEID(myid);
10:      WLMGR_LCDES *lcdes;
11:      float *loads;
12:      WLMGR_PROFILE_DEFINITION *pdef;
13:      csvrid_t rinst; /* redirect instance id */
14:
15:      /*
16:      ** If the workload manager is not online, simply return the
17:      ** system logical cluster id without doing anything.
18:      */
19:      if (wc->wl_localstate != WLMGR_STATE_ONLINE)
20:      {
21:          return WLMGR_LC_SYSTEMID;
22:      }
23:
24:      /* form the route data to perform our lookup */
25:      rd.rd_loginname = lp->lusername;
26:      rd.rd_loginlen = lp->lusernlen;
27:      rd.rd_appname = lp->lappname;
28:      rd.rd_applen = lp->lappnlen;
29:      rd.rd_aliasname = lp->lservname;
30:      rd.rd_aliaslen = lp->lservnlen;
31:
32:      /* get the correct logical cluster */
33:      lcdes = wlmgr___route_lookup(&rd);
34:
35:      if (lcdes == NULL)
36:      {
37:          /*
38:          ** No configured route was found for this connection.
39:          ** Therefore we route it to the open logical cluster.
40:          */
41:          lcdes = wc->wl_lcopen;
42:          WLMGR_TRACEPRINT_ROUTE(("wlmgr_route_connection: Spid %d being routing to open logical cluster '%.*s'.\n",
43:                      pss->pspid,
44:                      lcdes->lc_namelen,
45:                      lcdes->lc_name));
46:      }
47:
48:      /* initialize the redirection instance to 0 */
49:      rinst = 0;
50:
51: check_again:
52:      switch (lcdes->lc_lcstate)
53:      {
54:          case WLMGR_LCSTATE_FREE:
55:          case WLMGR_LCSTATE_INIT:
56:          case WLMGR_LCSTATE_OFFLINE:
57:          case WLMGR_LCSTATE_INACTIVE:
58:          case WLMGR_LCSTATE_FAILED:
59:          case WLMGR_LCSTATE_TIMEDWAIT:
60:          /*
61:          ** This logical cluster is not available to service this
62:          ** connection. Trigger the down routing option.
63:          */
64:          goto handle_downroute;
65:
66:          case WLMGR_LCSTATE_ONLINE:
67:          /*
68:          ** This logical cluster is available. If it is available
69:          ** on the local instance connect here. Otherwise if the
70:          ** client supports redirection they should be redirected.
```

```
 71:        */
 72:
 73:        /*
 74:        ** If we are in round-robin distribution we increment the round
 75:        ** robin instance then take a snap shot of it.
 76:        */
 77:        if (WLMGR_LOGINDIST_GET(lcdes) == WLMGR_LOGINDIST_ROUNDROBIN &&
 78:            HA_REDIRECT(lp) && WLMGR_LC_HAS_REDIRECT(lcdes))
 79:        {
 80:           /*
 81:           ** local spinlock protects the write of
 82:           ** lc_rrdist_instid
 83:           */
 84:           P_SPINLOCK(WLMGR_LOCAL_SPINLOCK);
 85:
 86:           /*
 87:           ** If the round robin instance is unitialized, we set
 88:           ** the starting point to one less than our instance.
 89:           ** This has the affect of starting as us if we are in
 90:           ** the map. It also will distribute the startin point
 91:           ** for various instances.
 92:           */
 93:           if (lcdes->lc_lc_rrdist_instid == 0)
 94:           {
 95:              lcdes->lc_rrdist_instid = myid –1;
 96:           }
 97:
 98:           /*
 99:           ** increment the round-robin instance to the next one
100:            ** in the current map.
101:           */
102:           lcdes->lc_rrdist_instid = CSVRMAP_NEXT(&lcdes->lc_currmap,
lcdes->lc_rrdist_instid);
103:           if (lcdes->lc_rrdist_instid == 0)
104:           {
105:              lcdes->lc_rrdist_instid = cms_get_low(&lcdes->lc_currmap);
106:           }
107:
108:           rinst = lcdes->lc_rrdist_instid;
109:           V_SPINLOCK(WLMGR_LOCAL_SPINLOCK);
110:
111:           /*
112:           ** safety check - if rinst is zero then the current map
113:           ** change out from under us. In this case we recheck
114:           ** the states.
115:           */
116:           if (rinst == 0)
117:           {
118:              goto check_again;
119:           }
120:
121:        }
122:
123:        switch (lcdes->lc_localstate)
124:        {
125:          case WLMGR_LCSTATE_ONLINE:
126:             /*
127:           ** We can connect locally, but in round-robin
128:           ** distribution mode we may need to redirect. If so,
129:           ** and this instance is not supposed to take the next
130:           ** connection, force a redirect.
131:           */
132:           if (WLMGR_LOGINDIST_GET(lcdes) ==
133:              WLMGR_LOGINDIST_ROUNDROBIN)
134:           {
135:              if (myid != rinst && HA_REDIRECT(lp))
136:              {
137:                 wlmgr_client_redirect(lcdes, rinst);
138:                 /* no return expected */
139:              }
140:           }
141:           else
142:           {
143:              /*
144:              ** Affinity distribution mode.
145:              **
```

```
146:        ** We can connect to this instance. However, we
147:        ** may need to redirect for the sake of load
148:        ** distribution.
```

At this point the connection routing function has determined that the client can connect to the instance. However, it also determines whether login redirection is appropriate. The following describes the checks that are made for purposes of determining whether the client should be redirected to another instance. Generally, a connection will be redirected if the following first level and second level tests are true:

First Level Tests:
1. The instance at the top of the redirect list, which should be the least loaded instance, is not this instance.
2. The client supports redirection
3. This logical cluster's load profile has a login threshold greater than zero, meaning load based login redirection should be done.
4. The instance at the top of the instance list is online for this LC If the above first level tests are true, the following second level tests are preformed:

Second level tests:
5. Workload of current instance is above the hysteresis value (base threshold)
6. As seen through this logical cluster's load profile, this instance's load exceeds the redirect instance by an amount in excess of the login threshold.

The following portion of the WLMGR_ROUTE_CONNECTION function provides for determining whether or not to redirect the connection as described above and for routing the client to the appropriate instance of the logical cluster, as well as code for handling other situations, such as when the logical cluster is offline.

```
168:        */
169:        rinst = lcdes->lc_redirectinst;
170:        pdef = &lcdes->lc_profile->wp_def;
171:        if (rinst != myid &&
172:            HA_REDIRECT(lp) &&
173:            pdef->wpdef_loginthreshold &&
174:            lcdes->lc_states[rinst] ==
                WLMGR_LCSTATE_ONLINE)
175:        {
176:          loads = lcdes->lc_profile->wp_loads;
177:          if (loads[myid-1] > pdef->wpdef_hysteresis &&
178:              (loads[rinst-1] == 0 ||
179:              ((float)(loads[myid-1] /
180:                loads[rinst-1]) - 1) * 100 >
181:                pdef->wpdef_loginthreshold))
182:          {
183:            /*
184:            ** Redirect this for load distribution
185:            ** purposes.
186:            */
187:            wlmgr_client_redirect(lcdes, 0);
188:
189:                /* no return expected */
190:          }
191:        }
192:
193:        }
194:
195:        /* we'll be keeping the connection locally */
196:        if (wlmgr_lc_connect(pss, lcdes, TRUE) == FALSE)
197:        {
198:            /*
199:            ** Failure to connect indicates thet logical
200:            ** cluster was locked. This means it went
201:            ** through some state transition. Restart
202:            ** our state check.
203:            */
204:            goto check_again;
205:        }
206:
207:        return lcdes->lc_id;
208:
209:      default:
210:        if (HA_REDIRECT(lp) &&
211:            WLMGR_LC_HAS_REDIRECT(lcdes))
212:        {
213:          wlmgr_client_redirect(lcdes, rinst);
214:
215:            /* no return expected */
216:        }
217:        else
218:        {
219:          /*
220:          ** We can't connect to this logical cluster,
221:          ** trigger the down routing option.
222:          */
223:          goto handle_downroute;
224:        }
225:
226:        break;
227:      }
228:
229:      break;
230:
231:    default:
232:      ex_raise(WLMGR, BAD_LCSTATE, EX_INTOK, 2,
233:          lcdes->lc_namelen, lcdes->lc_name, lcdes->lc_lcstate);
234:
235:    }
236:
237: handle_downroute:
238:    switch (WLMGR_LCDOWNROUTE_GET(lcdes))
239:    {
240:      case WLMGR_LCDOWNROUTE_OPEN:
241:        /*
242:        ** Try to connect this spid to the open logical
243:        ** cluster. Note that if we are already checking
244:        ** the open logical cluster we fall through to
245:        ** system mode.
246:        */
247:        if (lcdes != wc->wl_lcopen)
248:        {
249:          lcdes = wc->wl_lcopen;
250:          goto check_again;
251:        }
252:
253:        /* fall through */
254:
255:      case WLMGR_LCDOWNROUTE_SYSTEM:
256:        /*
257:        ** Connect this spid to the system logical cluster
258:        ** we can ignore the return code for the system lc.
259:        */
260:        (void) wlmgr_lc_connect(pss, wc->wl_lcsystem, TRUE);
261:        return WLMGR_LC_SYSTEMID;
262:
263:      case WLMGR_LCDOWNROUTE_DISCONNECT:
264:        /*
265:        ** Never disconnect connections with the sa_role.
266:        ** If we've gotten to this point, and the connection has the
267:        ** sa_role, then put it into the system lc instead of
268:        ** disconnecting it.
269:        */
270:        if (CHECK_AUTHORIZATION(SA_AUTH, pss))
271:        {
```

-continued

```
272:            (void) wlmgr_lc_connect(pss, wc->wl_lcsystem, TRUE);
273:            return WLMGR_LC_SYSTEMID;
274:        }
275:
276:        ex_callprint(EX_NUMBER(WLMGR_
                WLMGR_DISCONNECT), EX_PERMIT, 1);
277:
278:        quitfn(pss);
279:
280:        /* not reached */
281:        break;
282:    }
283:
284:    /* not expecting to reach here, so flag this as an error */
285:    return −1;
286: }
```

The following WLMGR_ROUTE_LOOKUP function determines the appropriate logical cluster given the passed in WLMGR_ROUTEDATA structure. This is a lower-layer routine that matches routing criteria to a logical cluster and implements the following precedence ordering: (1) Login; (2) Application; and (3) Alias as previously described.

```
 1: /*
 2: ** WLMGR_ROUTE_LOOKUP
 3: **
 4: ** Parameters:
 5: **    rd : ptr to a WLMGR_ROUTEDATA structure that is used
 6: **        to perform the routing lookup.
 7: **
 8: ** Returns:
 9: **    WLMGR_LCDES ptr that the routing data leads us to.
10: **    NULL if the routing data has no route.
11: **
12: */
13: WLMGR_LCDES *
14: wlmgr_route_lookup(WLMGR_ROUTEDATA * rd)
15: {
16:     WLMGR_ROUTEDES *rdes;
17:
18:     /* Do login lookup first */
19:     if (rd->rd_loginlen)
20:     {
21:         rdes = wlmgr_hashlookup(WLMGR_ROUTE_LOGIN,
22:                 rd->rd_loginname,
23:                 rd->rd_loginlen);
24:
25:         if (rdes && rdes->rt_state ==
                 WLMGR_RTSTATE_ACTIVE)
26:         {
27:             /*
28:             ** We found a matchin route, return the
29:             ** logical cluster it points to.
30:             */
31:             return (rdes->rt_lcdes);
32:         }
33:     }
34:
35:     if (rd->rd_applen)
36:     {
37:         rdes = wlmgr_hashlookup(WLMGR_ROUTE_APP,
38:                 rd->rd_appname,
39:                 rd->rd_applen);
40:
41:         if (rdes && rdes->rt_state ==
                 WLMGR_RTSTATE_ACTIVE)
42:         {
43:             /*
44:             ** We found a matchin route, return the
45:             ** logical cluster it points to.
46:             */
47:             return (rdes->rt_lcdes);
48:         }
49:     }
50:
51:     if (rd->rd_aliaslen)
52:     {
53:         rdes = wlmgr_hashlookup(WLMGR_ROUTE_ALIAS,
54:                 rd->rd_aliasname,
55:                 rd->rd_aliaslen);
56:
57:         if (rdes && rdes->rt_state ==
                 WLMGR_RTSTATE_ACTIVE)
58:         {
59:             /*
60:             ** We found a matchin route, return the
61:             ** logical cluster it points to.
62:             */
63:             return (rdes->rt_lcdes);
64:         }
65:     }
66:
67:     /* No matching route was found, return NULL */
68:     return NULL;
69: }
```

Logical Cluster Failover

If a cluster member fails, wlmgr will apply failover rules to reconfigure the logical clusters. Each logical cluster (which represents an application) can have its own failover resources and configuration. In the presently preferred embodiment, each logical cluster (LC) can have multiple failover groups which allow for prioritization of failover resources. The workload management system of the present invention includes a WLMGR_LC_FAILOVER function that handles failover situations. The following pseudocode describes the operation of this WLMGR_LC_FAILOVER function:

```
 1: */
 2: wlmgr_lc_failover(map_of_failed_instances)
 3: {
 4:     determine failover needs based on map of failed instances
 5:     and failover mode setting
 6:
 7:     for each possible failover group
 8:     {
 9:         for each instance starting with least loaded
10:         {
11:             if (instance is in this failover group &&
12:                 instance is available for use)
13:             {
14:                 add instance to failover target list;
15:
16:                 if (failover needs are met)
17:                 {
18:                     break to top level;
19:                 }
20:             }
21:         }
22:     }
23:
24:     if (failover needs not met &&
25:         logical cluster has fail_to_any attribute)
26:     {
27:         for each instance not already considered, starting with least
28:             loaded
29:         {
30:             if (instance is available for use)
31:             {
32:                 add instance to failover target list;
33:
34:                 if (failover needs are met)
35:                 {
36:                     break to top level;
37:                 }
38:             }
39:         }
40:     }
41:
```

```
42:       for each instance added to the failover target list
43:       {
44:           online logical cluster on this instance
45:       }
46:
47:       return (count of failovers brought online);
48: }
```

As shown, the above function activates failover instances based on information about the instances that are going down, the failover mode, and the available failover instances. As shown at line 9, each instance in a failover group is examined, starting with the least loaded instance. If an instance is in the failover group and is available for use, the instance is added to the failover list as shown at lines 11-14. If failover needs are not met from the instances in the failover group and the logical cluster has a "fail to any" attribute, then additional instances are considered as provided at lines 24 and following. For each instance added to the failover list, the logical cluster is onlined on the instance as provided at line 44. The function returns a count of failover instances brought online as provided at line 47.

Dynamic Load Distribution

Figure 7A:
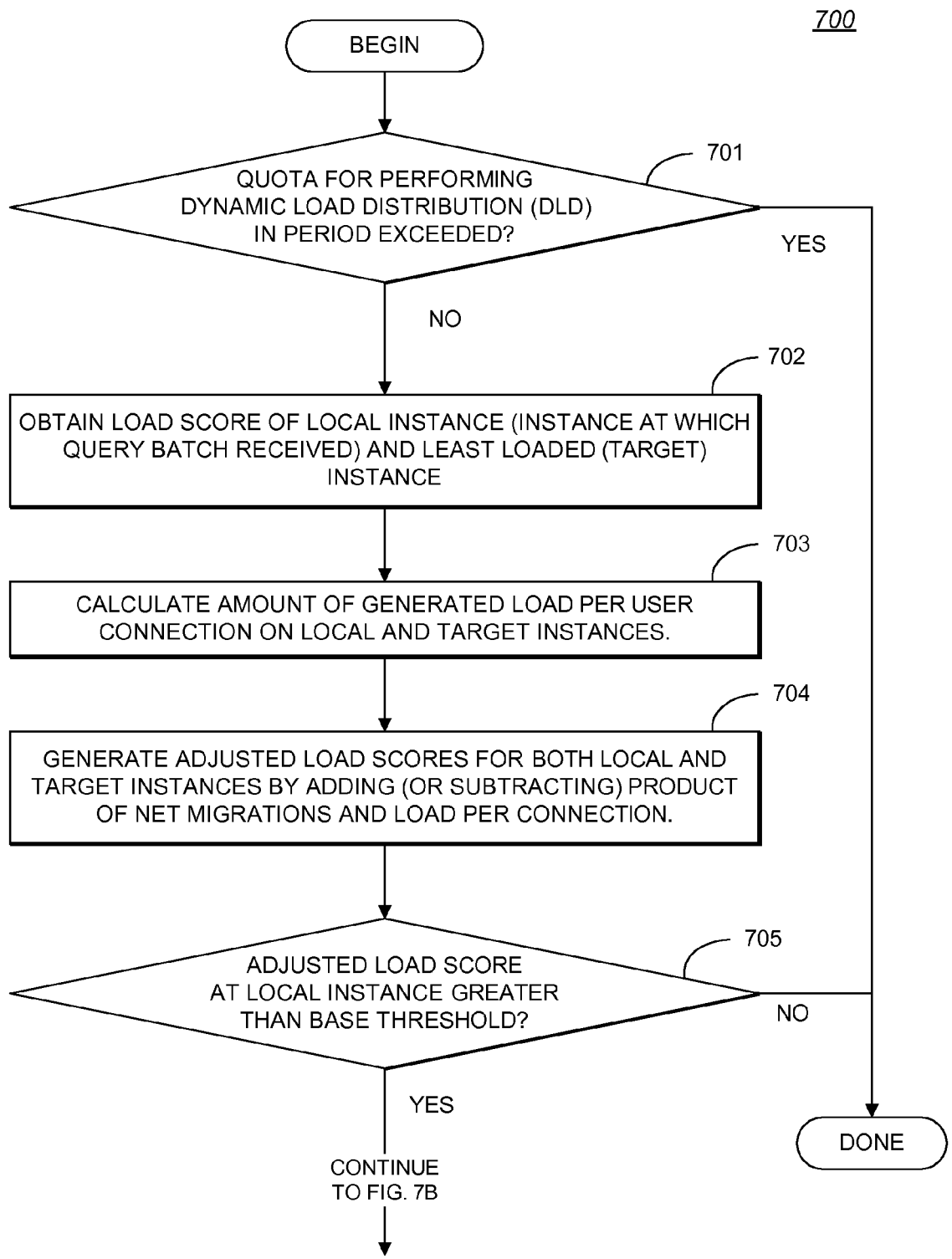
FIGS. 7A-B comprise a single flowchart illustrating the dynamic load distribution methodology of the present invention.
Figure 7B:
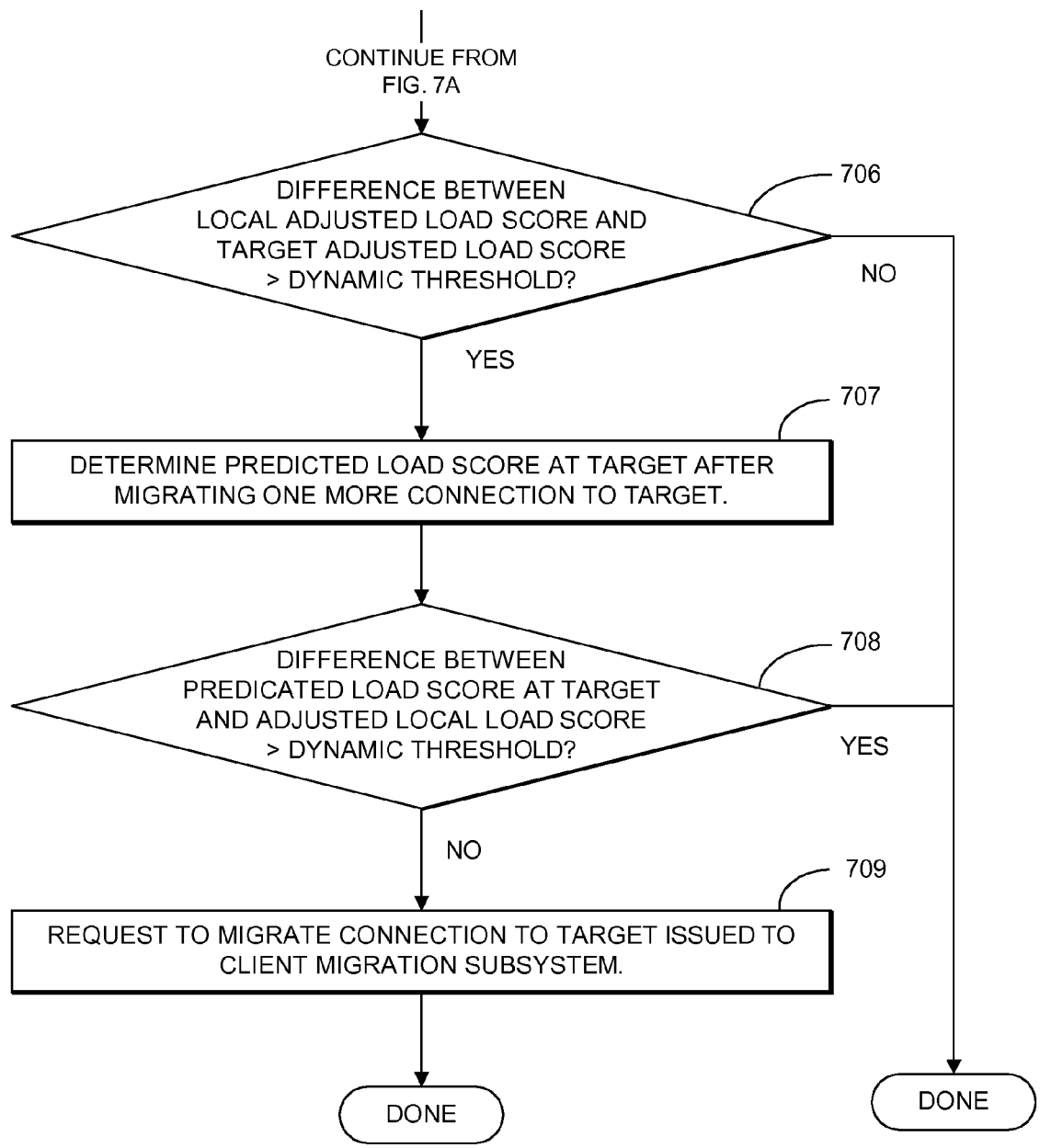

FIGS. 7A-B comprise a single flowchart 700 illustrating the dynamic load distribution methodology of the present invention. When a new batch of SQL queries is received from the client, dynamic load distribution features of the present invention operate to determine if the workloads are imbalanced and, if so, whether the connection should be migrated to another instance prior to executing the batch. In response to receipt of an SQL query batch from a given client, the method begins at step 701 by determining whether an established quota for performing dynamic load distribution (DLDs) in a given period has been exceeded. If so, the method returns (terminates) and no further DLD processing is performed. Otherwise, if the quota has not been exceeded the method proceeds to obtain the load score of the local instance (i.e., the instance at which the query batch was received) and the least loaded (target) instance at step 702. As previously described, load scores are calculated at each instance based on load profiles established for a logical cluster and information periodically collected by the kernel statistics collector. The present invention also provides for predicting and examining current and anticipated future workload as described in the following steps so as not to rely exclusively on historical measurements of workload at each instance. At step 703, the amount of generated load per user connection on the local and target instances is calculated. Next, the load scores for both the local and target instances are adjusted at step 704 by adding (or subtracting) the product of the net migrations and the load per connection. For example, if the local load per connection is 20 and two connections have already been migrated away from the node since the load scores were calculated, then the local load is adjusted by subtracting 40 (i.e., 20 times 2) from the load score. Similarly, if the target load per connection is 15 and two connections have been migrated to the target instance, a total of 30 (i.e., 15 times 2) is added to its load score.

After load scores have been calculated and adjusted, the adjusted load scores are examined to determine if the workload should be redistributed. At step 706, the adjusted load score at the local instance is compared to the base (or hysteresis) threshold. If the adjusted local load score does not meet the minimum threshold, the method terminates (returns). Otherwise, if the load score exceeds the threshold, the difference between the load score at the local instance and the load score at the target are compared to the configured dynamic threshold at step 707. If the difference between the adjusted local and target load scores does not exceed the configured dynamic threshold, the method ends (returns). Otherwise, the method proceeds to step 708. At step 708, the predicted load score at the target after migrating one more connection to the target is determined. At step 709, this predicated load score at the target is compared to the adjusted local load. If the predicted load at the target will now exceed the adjusted local load by an amount greater than the configured dynamic threshold, the method returns (terminates). This step is performed in order to avoid a "ping-pong" effect of migrating connections when migrating a connection to the target results in a similar workload imbalance as would be the case if the connection was left at the local node. Otherwise, if the predicted load score at the target does not exceed the local load at step 709, a request to migrate the connection to the target is issued to the client migration subsystem at step 710.

This following WLMGR_CHECK_AND_DO_DLD function is called to perform dynamic load distribution (DLD). It is called at the pre-batch migration point, checks the load profile for the associated logical cluster and reacts based on the load scores and the dynamic threshold. It should be noted that in a significant majority of cases this DLD function will return without requesting a migration. If it is determined that DLD migration of a connection is appropriate, a wlmgr_migrate_self( ) function is called to perform the migration. The following function returns TRUE if a migration request was initiated and FALSE if migration was not requested (e.g., because DLD not necessary, DLD has not been configured, or because of failure to pass migration checks of the function).

```
1:  /*
2:  ** WLMGR_CHECK_AND_DO_DLD
3:  **
4:  */
5:  int
6:  wlmgr_check_and_do_dld(void)
7:  {
8:      LOCALPSS(pss);
9:      LOCAL_INSTANCEID(myid);
10:     WLMGR_LOCALCTRL(wc);
11:     WLMGR_LCDES *lc;
12:     WLMGR_PROFILEDES *profile;
13:     WLMGR_PROFILE_DEFINITION *pdef;
14:     csvrid_t target_inst; /* least loaded inst in LC */
15:     float  my_load; /* my load score */
16:     float  target_load; /* lowest load score in LC */
17:     float  my_load_per_conn; /* my load per connection */
18:     float  target_load_per_conn; /* target load per conn */
```

```
19:       float   new_t_load; /* load after this mig */
20:       float   new_t_load /* target load after this mig */
21:       int     retval;
22:
23:       lc = pss->pwlmgr_lcdes;
24:       profile = lc->lc_profile;
25:       pdef = &profile->wp_def;
26:
27:       /* return immediately if DLD is not configured */
28:       if (pdef->wpdef_dynamicthreshold == 0)
29:       {
30:          return FALSE;
31:       }
32:
33:       target_inst = lc->lc_redirectinst;
34:
35:       /* return if we are the least loaded in this LC */
36:       if (myid == target_inst)
37:       {
38:          return FALSE;
39:       }
40:       /*
41:       ** See if another DLD operation is in progress on another engine. If
42:       ** so we just return without checking. If not, then we lock out the
43:       ** engines. This is done to prevent too much DLD migration in a given
44:       ** timeframe. We dirty read first for optimization.
45:       */
46:       if (wc->wl_DldLock)
47:       {
48:          return FALSE;
49:       }
50:
51:       P_SPINLOCK(WLMGR_LOCAL_SPINLOCK);
52:
53:       if (wc->wl_DldLock)
54:       {
55:          V_SPINLOCK(WLMGR_LOCAL_SPINLOCK);
56:          return FALSE;
57:       }
58:
59:       wc->wl_DldLock++;
60:
61:       V_SPINLOCK(WLMGR_LOCAL_SPINLOCK);
62:
63:       retval = FALSE;
64:
65:       /*
66:       ** Don't do a migration if we have exceeded the number of DLDs allowed
67:       ** per load update interval on the local or target instance.
68:       **
69:       */
70:       if (-(wc->wl_netDldMigrations[myid-1]) >= WLMGR_MAX_DLD_PER_INTERVAL ||
71:           wc->wl_netDldMigrations[target_inst-1] >= WLMGR_MAX_DLD_PER_INTERVAL)
72:       {
73:          goto unlock_and_return;
74:       }
75:
76:       /*
77:       ** We actually predict the load score by adjusting it based on how
78:       ** many DLD migrations have occured since the last load update.
79:       */
80:       my_load = profile->wp_loads[myid - 1];
81:       target_load = profile->wp_loads[target_inst - 1];
82:
83:       if (wc->wl_connections[myid-1])
84:       {
85:          my_load_per_conn = my_load / wc->wl_connections[myid-1];
86:       }
87:       else
88:       {
89:          my_load_per_conn = my_load;
90:       }
91:
92:       if (wc->wl_connections[target_inst-1])
```

```
 93:      {
 94:         target_load_per_conn = target_load /
 95:            wc->wl_connections[target_inst-1];
 96:      }
 97:      else
 98:      {
 99:         target_load_per_conn = target_load;
100:      }
101:
102:      my_load += (float) wc->wl_netDldMigrations[myid-1] *
my_load_per_conn;
103:      target_load += (float) wc->wl_netDldMigrations[target_inst-1] *
104:         target_load_per_conn;
105:
106:      /* return if our load is below the hysteresis value */
107:      if (my_load < pdef->wpdef_hysteresis)
108:      {
109:         goto unlock_and_return;
110:      }
111:
112:      /*
113:      ** We are getting somewhere. At this point we know that:
114:      ** Our LC / Profile supports DLD
115:      ** We are not the least loaded in the LC
116:      ** Our load has exceeded the hysteresis (floor value)
117:      ** We've factored in DLD migrations since the last load update
118:      ** At this point we just need to see if our load exceeds the least
119:      ** loaded instance by the dynamic threshold.
120:      */
121:      if (target_load == 0 ||
122:         (((float) my_load / target_load) − 1) * 100 >
123:         pdef->wpdef_dynamicthreshold)
124:      {
125:         /*
126:         ** We exceeded the threshold, but we have one more safety
127:         ** check. We want to make sure that transferring this one
128:         ** session will not make the load on the target instance higher
129:         ** than the load on the local instance.
130:         */
131:         new_load = my_load − my_load_per_conn;
132:         new_t_load = target_load + target_load_per_conn;
133:
134:         if (new_load == 0 ||
135:            (((float) new_t_load / new_load) − 1) * 100 >=
136:            pdef->wpdef_dynamicthreshold)
137:         {
138:            goto unlock_and_return;
139:         }
140:
141:         /* looks like it is good idea to do the migration */
142:         if (!wlmgr_migrate_self())
143:         {
144:            /* can't post a migration request */
145:            goto unlock_and_return;
146:         }
147:
148:         /*
149:         ** We were able to post a migration request. Adjust
150:         ** the net migration counts in the control structure.
151:         */
152:         if (ocm_lock(&wc->wl_ocb, EX_OBJ) >= OCM_SUCCESS)
153:         {
154:            wc->wl_netDldMigrations[myid-1]--;
155:            wc->wl_netDldMigrations[target_inst-1]++;
156:            ocm_push_unlock(&wc->wl_ocb, 0, NULL);
157:         }
158:
159:         retval = TRUE;
160:         goto unlock_and_return;
161:
162:      }
163:
164: unlock_and_return:
165:      P_SPINLOCK(WLMGR_LOCAL_SPINLOCK);
166:      wc->wl_DldLock--;
```

```
167:    V_SPINLOCK(WLMGR_LOCAL_SPINLOCK);
168:
169:    return retval;
170: }
```

In addition to obtaining and examining recorded load scores, the above function also predicts (i.e., takes into account) changes in the load score since the load score was last computed as shown above at lines 80 to 104. This prediction is calculated based on taking the last load score and dividing it by the number of connections active at the time that score was generated. The quotient calculated in this manner is a generalization of the load generated per user connection. Currently, the average load per connection is determined by averaging the total load over the number of connections. However, those skilled in the art will appreciate that there are other approaches that may also be utilized. For example, one may choose instead to examine the workload performed by an individual session or by connections from the same application. Next, the load per user connection is multiplied by the net DLD migrations since the load was last computed. The product is added to (or subtracted from) to the load score for the local and target instances to factor in migrations performed since the load was last computed.

The above WLMGR_CHECK_AND_DO_DLD function also makes one other final check to predict the impact of migrating the current connection before requesting that the connection be migrated. As illustrated above at lines 131-139, this load score prediction is performed by checking to make sure that transferring one connection (session) will not make the load on the target instance significantly higher than the load on the local instance. Consider, for example, the case of a single connection generating a lot of load. If DLD migration is evaluated based solely on thresholds and the above calculations, the connection generating significant workload may end up "ping-ponging" back and forth between instances. To avoid this situation, the check that is made attempts to make sure that migrating the connection will not result in the target instance being on the wrong side of the dynamic threshold.

Processing of Actions by Workload Manager

A WLMGR_ACTION_SUBMIT function that handles administrative requests for some command (action), such as failover of a logical cluster. The function runs in the context of the administrator's database tasks. Internally this function manages the staging and posting of actions. The arguments are converted into an action message that is staged cluster wide. Once the action has been successfully staged at all instances, the WLMGR_ACTION_SUBMIT function posts it to the workload manager daemon (again, cluster-wide). The actual execution of the action takes place in the daemon context.

Figure 8:
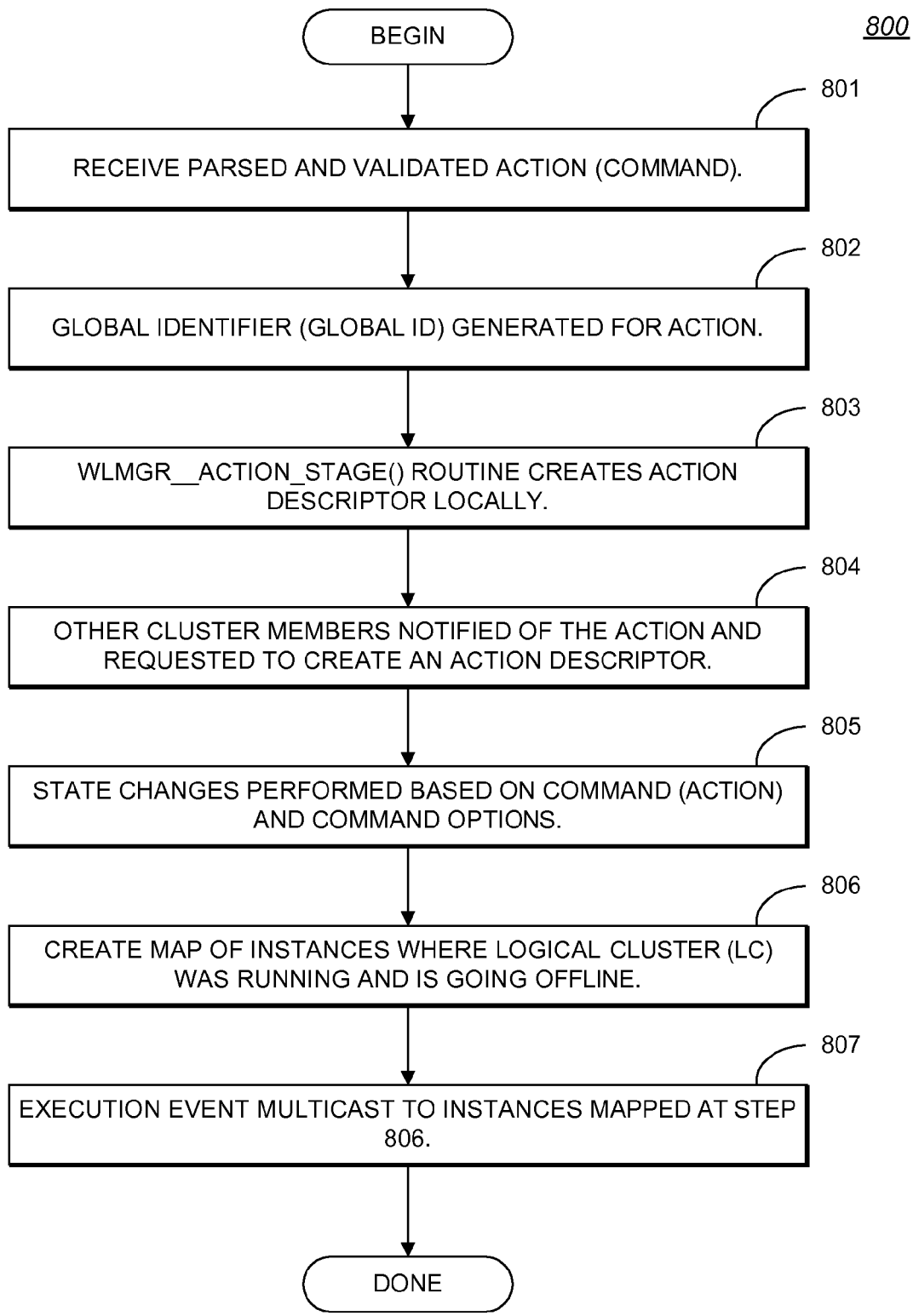
FIG. 8 is a flowchart illustrating the high-level method steps for the submission and staging of actions.

FIG. 8 is a flowchart 800 illustrating the high-level method steps for the submission and staging of actions. The method begins at step 801 with the receipt of an action (command) which has been parsed and validated. At step 802, a global identifier (global ID) is generated for the action. At step 803, a wlmgr_action_stage( ) routine creates an action descriptor locally. Next, other cluster members are notified of the action and requested to create an action descriptor at step 804. At step 805, state changes are performed based on the command (action) and command options. At step 806, a map of instances where the logical cluster (LC) was running and is going offline is created (note that following step 805 the logical cluster will be in the TIMED_WAIT state on these instances). At step 807, an execution event is multicast to the cluster instances mapped in step 806. The method returns at this point. The action (command) will complete asynchronously as hereinafter described.

A WLMGR_ACTION_EXECUTE function runs in response to the receipt of an action execute event generated by the above WLMGR_ACTION_SUBMIT routine. It is run in the context of the wlmgr daemon task on any cluster instance that has a logical cluster going from online to offline as a result of the action. The following high-level pseudocode outlines the operations of the WLMGR_ACTION_EXECUTE function.

1: 1. if there are no local users complete the action now.
2: 2. branch on the wait option associated with the action:
3: INFINITE WAIT:
4: mark connections to migrate when they can;
5: NO WAIT/IMMEDIATE:
6: kill all user connections;
7: WAIT A FINITE TIME:
8: mark connections to migrate or disconnect when they
9: become quiescent;
10: set an internal timer to expire at the end of the wait period
11: (when that timer expires the wlmgr daemon will wake and
12: kill any remaining connections)
13: 3. return, allowing the daemon to sleep for other events.

Logical Cluster State Diagram

Figure 9:
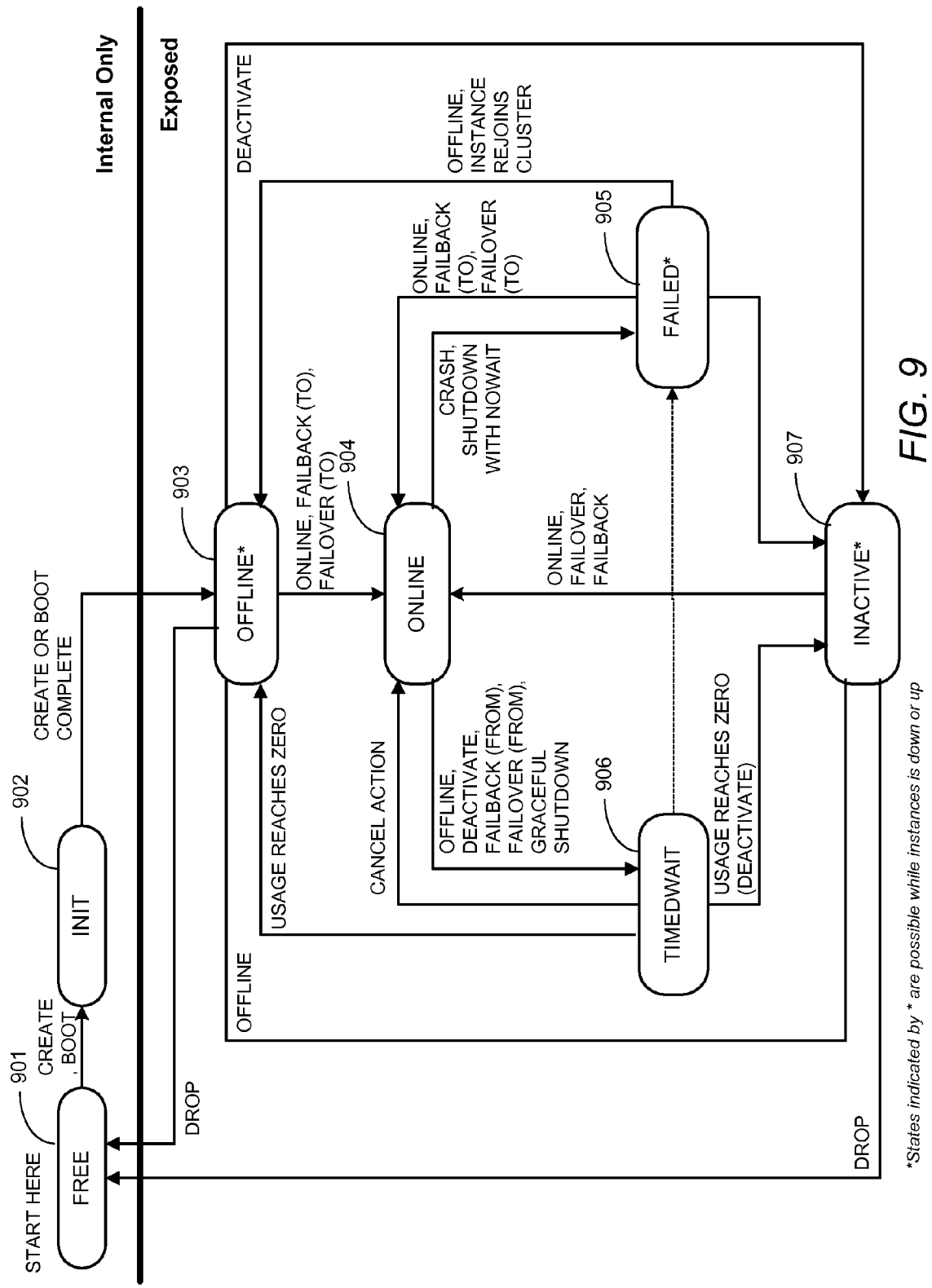
FIG. 9 is a logical cluster state diagram showing the logical cluster state transitions which occur in the presently preferred embodiment.

FIG. 9 is a logical cluster state diagram 900 showing the logical cluster state transitions which occur in the presently preferred embodiment. As shown, the initial state is FREE as shown at 901. The FREE state indicates that a logical cluster either does not exist or has no representation on a given instance. In response to system boot or logical cluster creation, the logical cluster enters a transitional INIT state as shown at 902. When creation of the logical cluster or boot is complete, the logical cluster enters the OFFLINE state as shown at 903. At the instance level, the OFFLINE state indicates that the logical cluster is not currently running on that instance. This means that it will not accept connections, has no active connections, and is not consuming resources.

A logical cluster may be brought ONLINE by online, failback (to) and failover (to) commands as shown at 904. At the instance level, the ONLINE state indicates the logical cluster is accepting and managing connections on that instance. The ONLINE state applies to both base and failover instances. The INACTIVE state shown at 907 is similar to the OFFLINE state, except that inactive instances are not eligible for failover and are not brought online as the result of autostartup. The INACTIVE state is only attained via the deactivate command. The FAILED state is similar to the INACTIVE state. As shown at 905, the FAILED state is reached when an instance in the ONLINE state abruptly exits the cluster, for instance via shutdown with nowait or via a crash.

The TIMEDWAIT state illustrated at 906 at FIG. 9 is a transitional state. When a logical cluster is ONLINE on an instance, it must enter the TIMEDWAIT state prior to reaching OFFLINE or INACTIVE. While in the TIMEDWAIT state no new connections are routed to that logical cluster/instance, but existing connections continue to run until they migrate or disconnect.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for allocating workload amongst a plurality of database servers sharing access to data, the method comprising:
    periodically collecting information about workload at each database server, wherein each database server is organized into one of a plurality of logical clusters, and wherein each logical cluster comprises at least one database server and is associated with a particular application;
    distributing the workload information to each of said plurality of database servers;
    in response to a client connected to a first database server requesting that work be performed, examining the workload information at the first database server to determine whether the requested work should be performed at a second database server having a lower workload than the first database server;
    if it is determined at the first database server that the work should be performed at the second database server, automatically transferring the client connection to the second database server and performing the requested work at the second database server; and
    otherwise, performing the requested work at the first database server.

2. The method of claim 1, wherein said examining step includes substeps of:
    if the workload at the first database server is greater than a pre-defined base threshold, calculating difference between workload at the first database server and workload at the second database server; and
    transferring the requested work to the second database server if the difference in workload is calculated to be greater than a dynamic threshold.

3. The method of claim 2, wherein the dynamic threshold is user configurable.

4. The method of claim 1, further comprising:
    receiving user input of a load profile including weights to be applied to elements of the workload information in calculating workload; and
    calculating workload at the first database server and the second database server using said load profile.

5. The method of claim 1, wherein the first database server and the second database server are associated with a particular logical cluster.

6. The method of claim 1, wherein workload is calculated separately at database servers of each logical cluster, so as to isolate a given logical cluster from other logical clusters.

7. The method of claim 1, further comprising:
    receiving user input of a logical cluster load profile including weights to be applied to elements of the workload information in calculating workload at database servers of a given logical cluster.

8. The method of claim 1, wherein said workload information include selected ones of user connection metrics, CPU utilization metrics, run-queue length metrics, Input/Output (I/O) load metrics, and online database engine metrics at each database server.

9. The method of claim 8, wherein said workload information further comprises a user-configurable metric which enables users to specify custom information to be used in calculating workload.

10. The method of claim 8, further comprising:
    calculating workload based on applying user configurable weightings to said workload information.

11. The method of claim 10, further comprising:
    generating an ordered list of database servers to which a client should connect based, at least in part, upon the calculated workload; and
    upon failure of the first database server while the client is connected to the first database server, using the ordered list for selecting a database server to which the client should failover.

12. A computer-readable medium having processor-executable instructions for performing the method of claim 1.

13. The method of claim 1, further comprising:
    downloading a set of processor-executable instructions for performing the method of claim 1.

14. In a distributed database system comprising a plurality of servers sharing access to data, a method for directing clients to connect to servers based on workload, the method comprising:
    periodically collecting statistics about workload at each of said plurality of servers, wherein each of the plurality of servers is organized into one of a plurality of logical clusters, and wherein each logical cluster comprises at least one server and is associated with a particular application;
    calculating a load score for each server based on the collected statistics;
    distributing the load score to each of the plurality of servers;
    in response to a client attempting to connect to a particular server, determining at the particular server whether the client should be redirected to another server based on the load scores of each of the plurality of servers;
    if it is determined that the client should be redirected to another server, providing the client with an ordered list of servers to which the client may connect; and
    otherwise, allowing the client to connect to the particular server.

15. The method of claim 14, wherein the servers comprise database servers sharing access to at least one database.

16. The method of claim 14, wherein said determining step includes substeps of:
    determining whether the load score at the particular server is greater than a pre-defined base threshold;
    if the load score is greater than a pre-defined base threshold, determining whether difference between load score at the particular server and load score at another server is greater than a login threshold; and
    if the difference in the load score is determined to be greater than the login threshold, redirecting the client to another server.

17. The method of claim 16, wherein the login threshold is user configurable.

18. The method of claim 14, further comprising:
    receiving user input of a load profile including weights to be applied to the workload statistics in calculating a load score for each server; and
    calculating a load score for each server using said load profile.

19. The method of claim 14, wherein load scores are calculated separately at servers of each logical cluster, so as to isolate a given logical cluster from other logical clusters.

20. The method of claim 14, further comprising:
receiving user input of a load profile for a given logical cluster including weights to be applied to the workload statistics in calculating a load score at servers of the given logical cluster.

21. The method of claim 14, wherein said workload statistics include selected ones of user connection metrics, CPU utilization metrics, run-queue length metrics, Input/Output (I/O) load metrics, and online database engine metrics at each server.

22. The method of claim 20, wherein said workload statistics include a user-configurable metric which enables a user to specify custom information to be used in calculating load scores.

23. The method of claim 20, further comprising:
calculating load scores based on applying user configurable weightings to said workload statistics.

24. The method of claim 14, wherein said ordered list of servers comprises an list of servers ordered based, at least in part, upon the calculated load scores.

25. The method of claim 14, further comprising:
periodically updating the ordered list of servers based on periodic updates to the workload statistics;
providing the ordered list of servers to a client connected to a given server; and upon failure of the given server while the client is connected to the given server,
using the ordered list for selecting a server to which the client should failover.

26. A computer-readable medium having processor-executable instructions for performing the method of claim 14.

27. The method of claim 14, further comprising:
downloading a set of processor-executable instructions for performing the method of claim 1.

28. In a distributed database cluster comprising a plurality of database servers, a system for allocating workload amongst the plurality of database servers, the system comprising:
a statistics collector module at each database server in the cluster which periodically collects workload statistics at each database server;
a load profile module at each database server for calculating a load score for such database server based on the workload statistics and publishing the load score to other database servers in the cluster;
a workload manager module at each database server, responsive to a client requesting that work be performed at a first database server, which automatically transfers the client to a second database server when the workload manager at the first database server determines that the requested work should be performed at a second database server having a lower load score than the first database server; and
a logical cluster module enabling a user to organize the plurality of database servers into plurality of logical clusters, each logical cluster comprising at least one database server and associated with a particular application.

29. The system of claim 28, wherein said workload manager module at the first database server responds to an attempt by a client to connect to the first database server.

30. The system of claim 28, wherein said workload manager module responds to submission of a query batch by a client to connected the first database server.

31. The system of claim 28, wherein the client remains connected to the first database server when said workload manager module at the first database server determines that the load score at the first database server is less than a pre-defined base threshold.

32. The system of claim 31, wherein the workload manager calculates difference between the load score at the first database server and the load score at the second database server when the load score at the first database server is greater than the pre-defined base threshold.

33. The system of claim 32, wherein the workload manager module transfers the client to the second database server when the difference is greater than a user configured threshold.

34. The system of claim 28, wherein said load profile module calculates load scores based on a load profile which includes weights to be applied to elements of the workload statistics.

35. The system of claim 28, wherein said load profile module allows users to create a load profiles for a given logical cluster, the load profile including weights to be applied to elements of the workload statistics in calculating load scores at database servers of the given logical cluster.

36. The system of claim 28, wherein said workload statistics include selected ones of user connection metrics, CPU utilization metrics, run-queue length metrics, Input/Output (I/O) load metrics, and online database engine metrics at each database server.

37. The system of claim 36, wherein said workload statistics further comprises a user-configurable metric which enables users to specify custom information to be used in calculating load scores.

38. The system of claim 36, wherein the load profile module calculates load scores based on applying user configurable weightings to said workload statistics.

39. The system of claim 38, wherein the load profile module provides a client with an ordered list of database servers in the cluster to which the client should connect based, at least in part, upon the calculated load scores.

40. The system of claim 39, wherein the client uses the ordered list of database servers to select a database server to which the client should connect at login time.

41. The system of claim 39, wherein the client uses the ordered list of database servers to select a particular database server to which the client should connect upon failure of the client's current connection to a given database server.

* * * * *